(12) United States Patent
Zimmerman, III et al.

(10) Patent No.: US 12,130,681 B2
(45) Date of Patent: Oct. 29, 2024

(54) DECENTRALIZED POWER ARCHITECTURE

(71) Applicant: Vidergy Networks LLC, Royal Palm Beach, FL (US)

(72) Inventors: Ronald B. Zimmerman, III, Wellington, FL (US); Jonathan Scott Lane, Melbourne, FL (US); Yevgeny Frenkel, Titusville, FL (US)

( * ) Notice: Subject to any disclaimer, the term of this patent is extended or adjusted under 35 U.S.C. 154(b) by 0 days.

(21) Appl. No.: 18/160,291

(22) Filed: Jan. 26, 2023

(65) Prior Publication Data

US 2023/0236646 A1 Jul. 27, 2023

Related U.S. Application Data

(60) Provisional application No. 63/477,175, filed on Dec. 23, 2022, provisional application No. 63/267,145, filed on Jan. 26, 2022.

(51) Int. Cl.
*G06F 1/26* (2006.01)
*G06F 13/38* (2006.01)
(Continued)

(52) U.S. Cl.
CPC ............ *G06F 1/266* (2013.01); *G06F 13/382* (2013.01); *G06Q 20/085* (2013.01); *H02J 13/0005* (2020.01); *G06F 2213/0042* (2013.01)

(58) Field of Classification Search
CPC ...... G06F 1/266; G06F 1/3206; G06F 13/382; G06F 2213/0042; G05F 1/66;
(Continued)

(56) References Cited

U.S. PATENT DOCUMENTS

| 11,323,963 B1 * | 5/2022 | Lam ..................... H04W 88/04 |
| 2007/0045411 A1 * | 3/2007 | Honingford .......... G07F 15/003 235/375 |

(Continued)

FOREIGN PATENT DOCUMENTS

| DE | 102016111420 A1 * | 12/2016 |
| DE | 102017210724 A1 * | 12/2018 |
| KR | 102139484 B1 * | 7/2020 |

OTHER PUBLICATIONS

'Multimedia' in The Free On-Line Dictionary of Computing. Online Dec. 2, 1994. Retrieved from Internet Mar. 28, 2023. <http://foldoc.org/multimedia>. (Year: 1994).*

(Continued)

*Primary Examiner* — Thomas J. Cleary

(57) ABSTRACT

The device, method, and system embodiments described in this disclosure (i.e., the teachings of this disclosure) enable an authorization circuit having at least one authorization mechanism to cooperate with an access circuit having at least one key mechanism. Upon successfully authorizing at least one datum communicated from the key mechanism of the access circuit, the authorization circuit is arranged to deliver power having determined characteristics to the access circuit. In at least one embodiment, the authorization circuit is arranged as a circuit wired or wirelessly coupled to a power infrastructure in a building. In at least one embodiment, the access circuit is arranged as a smart power plug arranged to temporarily deliver power to a mobile computing device or other electrically powered device. In some cases, power is only delivered after a user consumes certain multimedia information. In some cases, power that is delivered is delivered for only a short time and is measured.

20 Claims, 13 Drawing Sheets

(51) Int. Cl.
*G06Q 20/08* (2012.01)
*H02J 13/00* (2006.01)

(58) Field of Classification Search
CPC .. G06Q 20/085; G06Q 20/20; G06Q 30/0207; G06Q 30/0238; G06Q 30/0268; G06Q 30/06; H02J 13/0005; H02J 3/14; H02J 13/00001; H02J 13/00002
See application file for complete search history.

(56) References Cited

U.S. PATENT DOCUMENTS

| | | | | |
|---|---|---|---|---|
| 2009/0192927 | A1* | 7/2009 | Berg | H01R 13/717 |
| | | | | 705/412 |
| 2010/0211643 | A1* | 8/2010 | Lowenthal | B60L 53/14 |
| | | | | 709/206 |
| 2010/0228687 | A1* | 9/2010 | Lewis, Jr. | G06Q 50/06 |
| | | | | 705/412 |
| 2011/0174875 | A1* | 7/2011 | Wurzer | B60L 53/31 |
| | | | | 320/109 |
| 2013/0254097 | A1* | 9/2013 | Marathe | G07F 15/005 |
| | | | | 705/35 |
| 2014/0067680 | A1* | 3/2014 | Turner | G06Q 20/425 |
| | | | | 705/44 |
| 2014/0172157 | A1* | 6/2014 | Bellamy, III | G06Q 20/40 |
| | | | | 700/232 |
| 2015/0288207 | A1* | 10/2015 | Walker, Jr. | H02J 7/0013 |
| | | | | 320/137 |
| 2017/0331321 | A1* | 11/2017 | Kan | H02J 13/00002 |
| 2017/0372288 | A1* | 12/2017 | Li | H01R 24/28 |
| 2018/0026404 | A1* | 1/2018 | Geo | H04W 88/04 |
| | | | | 439/620.21 |
| 2018/0056796 | A1* | 3/2018 | Ferris | H02J 3/322 |
| 2018/0241228 | A1* | 8/2018 | Kemppainen | H02J 13/00034 |
| 2019/0124752 | A1 | 4/2019 | Kelly | |
| 2019/0181638 | A1* | 6/2019 | Chapel | H02J 13/00004 |
| 2021/0191443 | A1* | 6/2021 | Melcer | G06Q 20/145 |
| 2021/0288451 | A1* | 9/2021 | Trenbath | H01R 13/6691 |
| 2022/0318842 | A1* | 10/2022 | Rengarajan | G07F 15/006 |
| 2022/0366418 | A1* | 11/2022 | Melcer | G06Q 20/326 |

OTHER PUBLICATIONS

Nicholls, Paul. "Electromagnetic Relay". Online May 2017. Retrieved from Internet Mar. 28, 2023. <https://pfnicholls.com/Electronics/relays.html>. (Year: 2017).*

EPO (Rijswijk) English language version of the International Search Report, Form PCT/ISA/210, for International Application PCT/US2023/061409, filed Jan. 26, 2023 (4 pages) (Year: 2023).*

EPO (Munich) English language version of the Written Opinion of the International Search Authority, Form PCT/ISA/237, for International Application PCT/US2023/061409, filed Jan. 26, 2023 (9 pages) (Year: 2023).*

* cited by examiner

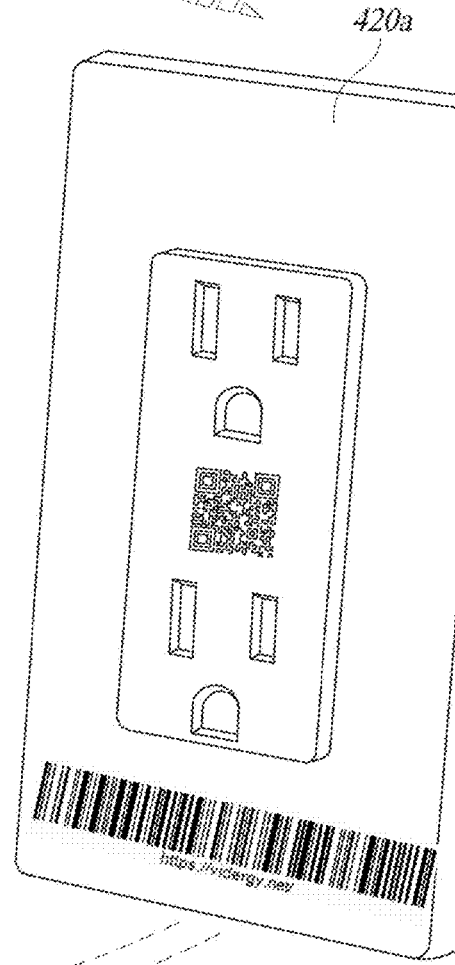

_500a_

MONETIZING PUBLIC POWER OUTLETS
TURNING COST CENTERS TO PROFIT CENTERS

SMART
BUILT-IN SMART CHIP RECOGNIZES THE INDIVIDUAL DEVICE'S CHARGING REQUIREMENTS TO OPTIMIZE THE CHARGE.

MONETIZE FOOT TRAFFIC
RECOVER COSTS BY PROVIDING AD SUPPORTED CHARGING TO YOUR FOOT TRAFFIC. TURN PUBLIC POWER OUTLETS "COST CENTERS" INTO REVENUE GENERATING "PROFIT CENTERS"

FEATURES & DETAILS
ENERGY MONITORING: THIS LoRaWan CONNECTED SMART OUTLET TRACK THE POWER CONSUMPTION OF CONNECTED DEVICES TO HELP MONITOR THE ENERGY CONSUMPTION IN REAL-TIME.

INDIVIDUALLY CONTROLLED: THE TWO SMART OUTLETS CAN BE CONTROLLED INDIVIDUALLY. 15A WALL OUTLET CAN CONTROL ELECTRICAL APPLIANCES UP TO 1800 WATTS, AND SATISFY ALL ELECTRICAL APPLIANCES AND DEVICES.

STRONG SAFETY PROTECTION
THIS RECEPTACLE PLUG SUPPORTS TAMPER RESISTANCE FUNCTION THAT IS DESIGNED TO PROTECT CHILDREN FROM ELECTRIC SHOCKS CAUSED BY TEMPERING WITH ELECTRICAL OUTLETS. IT ALSO SUPPORTS SURGE PROTECTION, SHORT CIRCUIT PROTECTION, AND OVERLOAD PROTECTION.

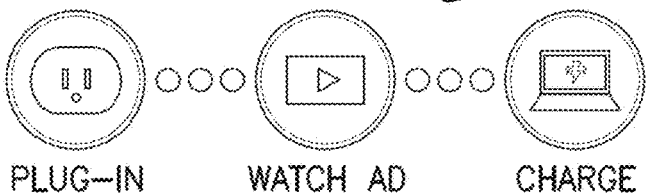

PLUG-IN   WATCH AD   CHARGE

CARROTLINQ

_Fig. 9C_

DECENTRALIZED POWER ARCHITECTURE

BACKGROUND

Technical Field

The present disclosure generally relates to a distributed power architecture. More particularly, but not exclusively, the present disclosure relates to a power source having an authorization mechanism and a power distribution circuit.

Description of the Related Art

Power lines transport electricity from one locale to another; sometimes over great distances. In many cases, the power lines pass over, through, or otherwise in proximity to areas populated by people and other living things. Often, the power lines are "tapped" to provide electricity at one or more points. This "tapping" permits power passing over the power lines to be diverted for consumption by streetlights, street signs, traffic lights, businesses, homes, and for other things. Generally, a power meter, which is owned or otherwise controlled by the provider of the power, measures power that is consumed at the point where the power is tapped for use by a consumer. The consumer may be a business, a household, an individual, or some other entity. Often times, at a point downstream the power meter, subordinate power lines provide access to power via direct connection (e.g., lighting, heating, air conditioning, and the like) or via any number of power outlets.

In many cases, power is not used efficiently. Power outlets, for example, often have power supply is plugged into them 24 hours per day, 7 days per week, 365 days per year. In at least some of these cases, the power supply is consuming electricity but there is no device connected to the power supply. In these and other cases, a device that is plugged into the power supply is not being used, monitored, or otherwise providing any benefit. In many of these cases, the power receptacles where power is being wasted are in commercial areas.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) enable an authorization circuit having at least one authorization mechanism to cooperate with an access circuit in some cases, the access circuit has at least one key mechanism. Upon successfully authorizing at least one datum communicated from the key mechanism of the access circuit, the authorization circuit is arranged to deliver power having determined characteristics to the access circuit. In at least one embodiment, the authorization circuit is arranged as a circuit wired or wirelessly coupled to a power infrastructure in a building. In at least one embodiment, the access circuit is arranged as a smart power plug arranged to deliver power to a mobile computing device.

In these and other cases, the device, method, and system embodiments described in this disclosure (i.e., The teachings of this present disclosure) provide power receptacle devices include authorization circuitry that restricts access to power until a user has interacted with an activation interface. The interaction interface be or include a barcode, a quick response (QR) code, a near field communications circuit, or some other interface. Upon such interaction which may include any suitable number of zero or more additional acts, the user is granted access to power from the receptacle for a determined period of time. In some cases, the power receptacle device includes power metering circuitry so that a measurement of power consumed having suitable precision can be determined. In these embodiments, power is saved, and the power grid is hardened.

In a first embodiment, a power receptacle device, includes a housing, a power receptacle contained in the housing, a globally unique identifier (GUID) associated with the power receptacle, an input power interface arranged to receive input power into the power receptacle device, a controllable switch coupled between the input power interface and the power receptacle, an activation interface, and a processor. The processor is arranged to receive a power activation signal and, based on the power activation signal, temporarily direct the controllable switch to pass power to the power receptacle, wherein the power activation signal is received after a user performs at least one confirming act associated with the GUID.

In some cases of the first embodiment, the power activation signal is receivable from a local bridge device. In some cases, the local bridge device is arranged to receive communications from the remote computing server and transmit communications toward the power receptacle. Sometimes, the input power is mains power, and sometimes, the input power is direct current (DC) power at a voltage of between 5 VDC and 50 VDC. In at least some cases, the power receptacle is arranged to receive conductive portions of a standardized power cord, the standardized power cord conforming to a household wiring protocol, and in some cases, the power receptacle is arranged to receive conductive portions of a power cord that conforms to a universal serial bus (USB) protocol. In these and other cases, the controllable switch includes at least one electromechanical relay. And sometimes, the power receptacle includes at least two individually controllable power outlets.

In a second embodiment, a computer-implemented method is performed to deliver power through a power receptacle to an electrically powered device that is electromechanically coupled to the power receptacle. The method includes receiving a power activation signal at a processor electrically coupled to the power receptacle, the power activation signal arranged to cause a controllable switch to deliver power to the electrically powered device through the power receptacle wherein the power activation signal is received after a user interacts with the power receptacle via an interaction interface. Here, sometimes, the user interaction includes bringing a mobile computing device in proximity to the power receptacle, capturing, with the mobile computing device, at least one datum representative of a globally unique identifier (GUID) associated with the power receptacle, communicating, via the mobile computing device, the GUID to a remote computing device, based on a response initiated by the remote computing device, performing a plurality of acts of a power activation protocol with the mobile computing device, after completion of at least one of the plurality of acts, communicating, via the mobile computing device, an evidence-of-completion signal to the remote computing device, and delivering the power to the electrically powered device through the power receptacle.

In some instances of the second embodiment, a first act of the plurality of acts of the power activation protocol includes delivering multimedia content through the mobile computing device for consumption by the user, wherein a second act of the plurality of acts of the power activation protocol includes communicating via the mobile computing device the evidence-of-completion signal, and wherein the evidence-of-completion signal is an indication that the multimedia content has been delivered.

In some instances of the second embodiment, the multimedia content is a video advertisement. In these and other instances, a first act of the power activation protocol includes accepting, at the mobile computing device, a representation of credit for access to power, and a second act of the plurality of acts of the power activation protocol includes communicating, via the mobile computing device, the evidence-of-completion signal. Here, the evidence-of-completion signal is an indication that the representation of credit has been entered.

In these and still other instances, the representation of credit is a voucher code, and the power activation signal may be triggered by a message communicated from a local bridge device towards the power receptacle.

In a third embodiment, a system to temporarily deliver power through a power receptacle, includes a plurality of power receptacle devices in a first geographic area, at least one remote computing server, and a bridge device. Here, each power receptacle device has a housing, a power receptacle contained in the housing, a globally unique identifier (GUID) associated with the power receptacle, an input power interface arranged to receive input power into the power receptacle device, a controllable switch coupled between the input power interface and the power receptacle, an activation interface, and a processor. The processor is arranged to receive a second power activation signal and, based on the second power activation signal, temporarily direct the controllable switch to pass power to the power receptacle. The second power activation signal is received after a user performs at least one confirming act associated with the GUID of the power receptacle device. Further, the at least one remote computing server has an engagement module arranged to receive a respective GUID from a mobile computing device proximate a respective power receptacle device associated with the user, a web host module arranged to serve one or more web pages to the mobile computing device based on the respective GUID, and an activation module arranged to cause a first power activation signal to be communicated toward a bridge device. What's more, the bridge device is arranged to receive the first power activation signal from the activation module of the at least one computing server and, based on receipt of the first power activation signal, communicate the second power activation signal towards a specific power receptacle device of the plurality of power receptacle devices, the specific power receptacle being associated with a respective GUID received by the engagement module.

In some cases of the third embodiment, the power receptacle is arranged to receive conductive portions of a standardized power cord, the standardized power cord conforming to a household wiring protocol. In some cases, the power receptacle is arranged to receive conductive portions of a power cord that conforms to a universal serial bus (USB) protocol. In some cases, the activation interface is a bar code or a quick response (QR) code, and in still some other cases, at least one web page served by the web host module is a multimedia advertisement.

Within the devices, systems, and methods discussed in the present disclosure, distributed ledger operations, digital currency operations, pay-for-power-as-you-go, and other power decentralization acts are performed efficiently, with reduced power costs, and in some cases proximate to where the results of such operations are verified. The innovation described in the present disclosure is new and useful, and the innovation is not well-known, routine, or conventional in the distributed ledger industry or any other known industry.

The innovation described herein uses, in some cases, known logic, circuitry, modules, and building blocks combined in new and useful ways along with other structures and limitations to create something more than has heretofore been conventionally known. The embodiments improve on computing systems which, when un-programmed or differently programmed, cannot perform or provide the specific distributed ledger operations claimed herein.

The embodiments described in the present disclosure improve upon known distributed ledger processes and techniques, known public key/private key processes and techniques, known pay-for-power techniques, and other known algorithmic methodologies.

The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts.

At least some of embodiments described herein use computerized technology to improve the technology of distributed ledger operations, but there are other techniques and tools remain available to perform distributed ledger operations. Therefore, the claimed subject matter does not foreclose the whole or even substantial distributed ledger technological area.

These features with other objects and advantages that will become subsequently apparent reside in the details of construction and operation as more fully described hereafter and claimed, reference being had to the accompanying drawings forming a part hereof.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL
VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 9A-9C are yet one more embodiment of a decentralized power architecture use case;

Figure 1:
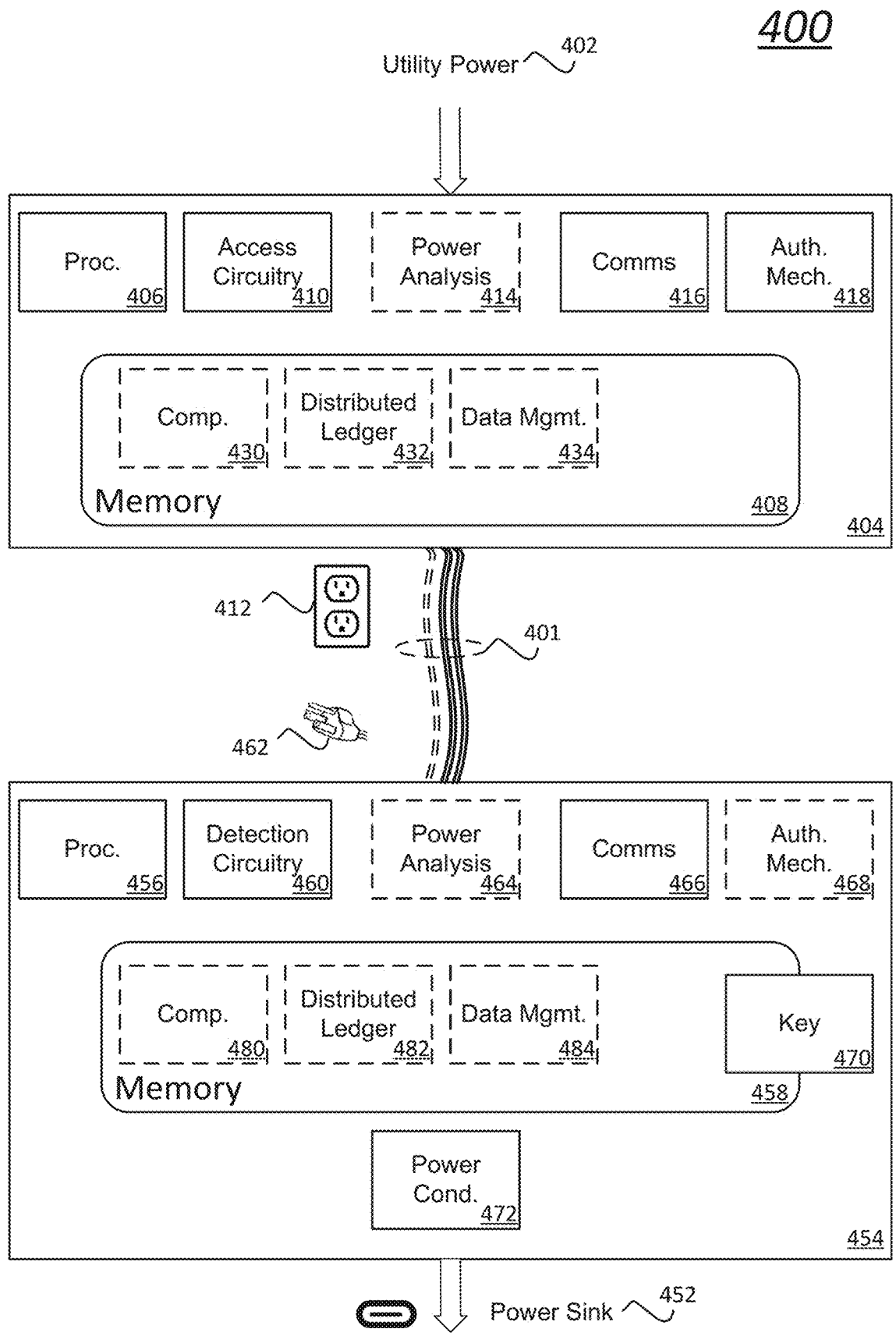
FIG. 1 is a system level deployment of a decentralized power architecture.

In the present disclosure, for brevity, certain sets of related figures may be referred to as a single, multi-part figure to facilitate a clearer understanding of the illustrated subject matter. For example, FIGS. 8A-8D may be individually or collectively referred to as FIG. 8. FIGS. 9A-9E may be individually or collectively referred to as FIG. 9. Structures earlier identified are not repeated for brevity.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring more detailed descriptions of the embodiments.

The device, method, and system embodiments described in this disclosure (i.e., the teachings of this disclosure) enable a decentralization of utility provided power. First electronic circuitry electrically coupled to a power source in a wired or wireless way provide an authorization and access mechanism to the electrical power of the power source. in some cases, second electronic circuitry couplable to a power sink in a wired or wireless way provides a key that cooperates with the first electronic circuitry to unlock the delivery of electrical power to a power sink.

In these and other cases, the device, method, and system embodiments described in this disclosure (i.e., The teachings of this present disclosure) provide power receptacle devices include authorization circuitry that restricts access to power until a user has interacted with an activation interface. The interaction interface be or include a barcode, a quick response (QR) code, a near field communications circuit, or some other interface. Upon such interaction, which may include any suitable number of zero or more additional acts, the user is granted access to power that is passed from the receptacle for a determined period of time. In some cases, the power receptacle device includes power metering circuitry so that a measurement of power consumed having suitable precision can be determined. In these embodiments, power is saved, and the power grid is hardened A power sink is any device, circuit, or other mechanism that is arranged to consume power. The consumption may be a direct consumption such as by a circuit that consumes power. Additionally, or alternatively, the consumption may be indirect consumption such as by a circuit that further passes power to a downstream device or circuit. A non-limiting, non-exhaustive list of power sinks includes consumer electronic devices, industrial equipment, military equipment, tools, lights, batteries, audio equipment, video equipment, telecommunications equipment, and the like. As understood by one of skill in the art, any type of device, circuit, or other mechanism that may be coupled to a power source in a wired or even wireless way may be a power sink. In the present disclosure, a power sink may also be interchangeably referred to as an electrically powered device.

Utility provided power, or mains power, as the terms are used herein, may include any power provided by a utility. The utility may be a power company, a municipality, a consortium, a government, a private entity, a public-private entity, or any other entity. The power may be produced by consumption of fossil fuels, air-powered structures (e.g., windmills), light powered structures (e.g., solar cells), water powered structures (e.g., wave power, hydro-electric dam, or the like), a chemical reaction, a nuclear reaction, or any other structures or materials capable of producing electricity. In many cases, the electricity provided by a utility power source is sold; in other cases or circumstances, the electricity is provided for other compensation or no compensation at all such as a public service. As the terms are used herein, utility provided power, utility power, utility power source, power provider, and the like may or may not be the entity that generates the power. In at least some cases, the power source is an interim service or entity (e.g., a "middleman") that distributes, manages, or otherwise permits access to electricity in exchange for goods or services.

To avoid unnecessarily obfuscating the teaching of the present disclosure, a system including a first authorization circuit embodiment and a second access circuit an embodiment are now described. The first authorization circuit is electrically coupled in a wired or wireless way to a power source, such as line power in a building (e.g., the electrical infrastructure in the building that supplies power through electrical sockets (e.g., electrical outlets). The second access circuit is added to or integrated with a power cube such as might be used to charge a mobile computing device battery (e.g., a power brick, a wall-wart, a charger, or the like). In at least some cases, the power cube has: a) two or three electrically conductive prongs that are arranged to mate with an electrical socket; b) one or more female ports (e.g., a universal serial bus (USB) port, a power jack such as a 1.7 to 5.5 millimeter power jack, a THUNDERBOLT port, or the like) arranged to provide downstream power through a device power cable; and c) an electrical circuit to condition the utility-side power signal into a suitable device-side power signal (e.g., a circuit to condition an incoming 110 VAC power signal into a 5 VDC power signal). Optionally, one or both of the first and second circuits may include power analysis circuitry.

FIG. 1 is one system level deployment of a decentralized power architecture 400. Utility power 402 (i.e., mains power) is received from a power company, a utility service provider, or some other source. The utility power may be AC mains power at 60 VAC, 120 VAC, 230 VAC, 240 VAC, 400 VAC, or some other AC voltage, and the AC mains power may have a frequency of 60 Hertz or 50 Hertz in at least some cases.

A first authorization circuit 404 is arranged for electrical and communicative coupling to a second access circuit 454. Each of the circuits has a processor 406, 456, respectively, and memory 408, 458, respectively. Each processor is coupled to its respective memory and arranged to execute software instructions stored in the memory.

The first authorization circuit 404 includes access circuitry 410, and the second access circuit 454 includes detection circuitry 460. The access circuitry 410 and the detection circuitry 460 may include one or more relays, latches, semiconductor switches, or other components. The access circuitry 410 is arranged to fully or partially couple the utility power to an output 412. The output 412 may have any suitable form factor. The detection circuitry 460 is arranged to detect the presence of a voltage signal at an input 462.

The first authorization circuit 404 optionally includes first power analysis circuitry 414, and the second access circuit 454 optionally includes second power analysis circuitry 464. When so included, the power analysis circuitry 414, 464 may be arranged to analyze power that is passed through its respective circuitry. The analysis may include measurements, calculations, predictions, or the like to generate data associated with the power. Data may include voltage, current, phase, frequency, joules per unit time, noise, changes over time, and any other suitable power signal. In some cases, the power analysis generates, accumulates, or otherwise collects such data over time, and such data may be provided in whole or in part to another entity in exchange for something of value, such as a fee. In some cases, the power analysis circuitry 414/464 may be referred to as power metering circuitry.

The access circuitry 410 and the detection circuitry 460 may include one or more relays, latches, semiconductor switches, or other components. The access circuitry 410 is arranged to fully or partially couple the utility power to an output 412. The detection circuitry 460 is arranged to detect the presence of a voltage signal at an input 462.

The first authorization circuit 404 includes first communications circuitry 416, and the second access circuit 454 includes second communications circuitry 466. The first and second communications circuits 416, 466 are arranged for unidirectional or bidirectional communications between them according to any suitable protocol. The communications may be wired or wireless. In at least some cases, the communications between the first authorization circuit 404 and the second access circuit 454 is performed to determine if a certain power sink device 452 is authorized to receive power.

In these or other cases, one or both of the first and second communications circuits 416, 466 is arranged for long range communications. Long range communications may be by direct line of sight communication, over the horizon communications, or some other type of communications. The communications may conform to a particular hardware protocol, software protocol, or combined hardware and software protocol. For example, in some cases, one or both of the first and second communications circuits 416, 466 conforms to a long range wireless access network (LoRaWAN) specification. In these or other cases, one or both of the first and second communications circuits 416, 466 conforms to a long-term evolution (LTE) cellular specification, a fifth generation (5G) cellular specification, a sixth generation (6G) cellular specification, or some other suitable protocol.

The first authorization circuit 404 includes a first authorization mechanism 418, and optionally, the second access circuit 454 includes second authorization mechanism 468. Additionally, or in some cases optionally, the second access circuit 454 includes a key mechanism 470. The key mechanism 470 is arranged to cooperate with the first authorization mechanism 418. In some cases, each of the first authorization mechanism 418 and the key mechanism 470 are partially or fully implemented as hardware circuits. In other cases, the first authorization mechanism 418 and the key mechanism 470 are partially or fully implemented in software. In at least one case, the first authorization mechanism 418 and the key mechanism 470 include both hardware and software components. The hardware circuitry may include random number generator circuitry, timer circuitry, micro-electrical mechanical systems (MEMS) circuitry, and the like. The software components may include hash functions, encryption/decryption algorithms, and the like. In at least one case, a software key of the key mechanism 470 is communicated via the first and second communications circuitry 416, 466 from the second access circuit 454 to the first authorization circuit 404 when the input 462 is electromechanically coupled (e.g., plugged in) to the output 412 of the first authorization circuit 404. Upon receiving the software key and validating the key with the first authorization mechanism 418, the access circuitry 410 is triggered to provide certain power 401 at the output 412. In other cases, as described in the present disclosure, the access circuitry 410 is triggered to provide the certain electrical power 401 in another way.

In some embodiments, provision of power at the output 412 may be particularly associated with the key mechanism 470. For example, in some cases, a consumer has paid a particular compensation to receive "full power." In such cases, the consumer may more quickly charge their power sink device 452 (e.g., smartphone, laptop, or the like). The particular compensation provided, as discussed in the present disclosure may include monetary compensation, data, digital currency, a promise, a service, or any other suitable remuneration. In other embodiments, provision of electrical power at the output 412 is associated with a different validation mechanism such as the mechanism of FIGS. 7-11.

In at least some cases, one or more of the circuits described herein are cascaded. Considering one case, for example, the first authorization circuit 404 and the second access circuit 454 cooperate such that power is delivered from the utility power source 402 to the second access circuit 454, which is configured as a power cube. Subsequently, the second access circuit 454 and a downstream power sink device 452, which is configured as a mobile computing device cooperate to deliver power from the power cube to the mobile computing device. At this second level of the cascade, the mobile computing device includes its own key mechanism (not shown) that cooperates with the optional authorization mechanism 468 of the second access circuit 454.

The second access circuit 454 includes power conditioning circuitry 472. The power conditioning circuitry 472 may be arranged to change the input power signal to a suitable output power signal. In some cases, such changing may include rectification from an alternating current (AC) signal to a direct current (DC) signal, changing voltage, regulating the amount of current that the power sink device 452 may draw, and the like. In at least some cases, a timer or clock associated with the power conditioning circuitry 472 controls a duration of power availability at the output of the second access circuit 454.

Optionally, the respective memories 408, 458 of the first authorization circuit 404 and second access circuit 454 include functional software arranged to decentralize power from a traditional metered function at an entity level (e.g., a power meter in an apartment, a power meter for an entire building, a power meter for a region, and the like) to an individual entity.

The memory 408 of the first authorization circuit 404 may optionally store zero or more of a compensation module 430, a distributed ledger module 432, a data management module 434, and any other suitable software.

Figure 2:
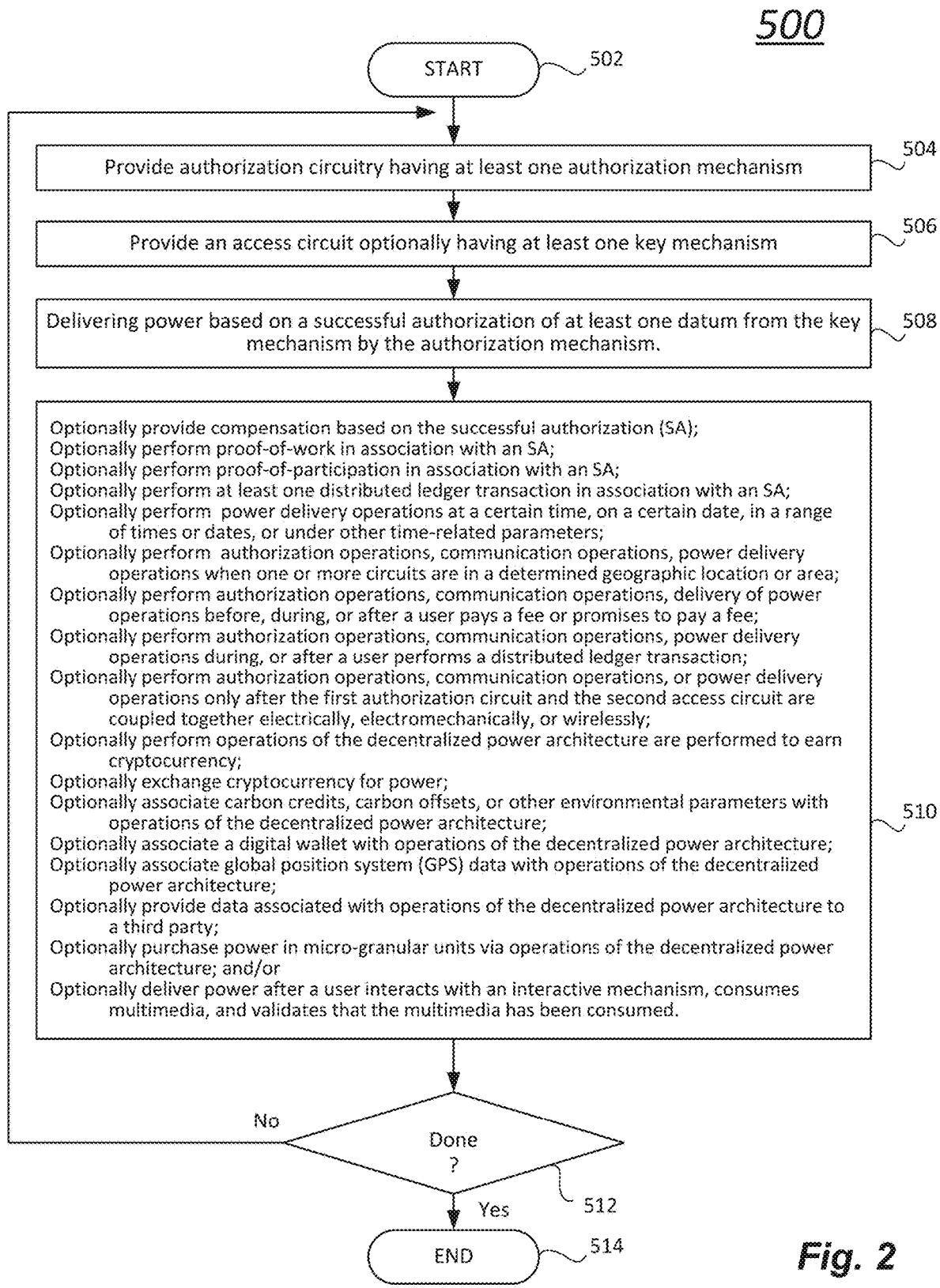
FIG. 2 is a data flow diagram of a decentralized power architecture method.

The memory 458 of the second access circuit 454 may optionally store zero or more of a compensation module 480, a distributed ledger module 482, a data management module 484, and any other suitable software FIG. 2 is a data flow diagram of one decentralized power architecture method 500. Processing begins at 502.

At 504, an authorization circuit is provided. The authorization circuit optionally has at least one authorization mechanism. Various authorization mechanism embodiments are described in detail in the present disclosure. Processing advances to 506.

At 506, an access circuit is provided. The access circuit has at least one key mechanism in this embodiment, however, and in other embodiments, the authorization mechanism does not involve or require a key mechanism. Various access mechanism embodiments are described in detail in the present disclosure. Processing advances to 508.

At 508, based on a successful authorization of at least one datum from the key mechanism by the authorization mechanism, power is delivered. Optionally, and in other embodiments, and authorization mechanism triggers the delivery of power based on power activation criteria. Power may be delivered on a temporary basis. That is, in some cases, power will only be delivered for a temporary period of time. Processing advances to 510.

Optional processing at 510 may occur before power is delivered, after power is delivered, and while power is being delivered.

Optional processing may include optionally providing compensation based on a successful authorization; optionally performing proof-of-work in association with a successful authorization; optionally performing proof-of-participation in association with a successful authorization; and optionally performing at least one distributed ledger transaction in association with a successful authorization. Other optional processing may be performed.

In some cases, authorization operations, communication operations, and/or power delivery operations are only performed at a certain time, on a certain date, in a range of times or dates, or under other time-related parameters.

In some cases, authorization operations, communication operations, and/or power delivery operations are only performed when one or more circuits is in a determined geographic location or area. In such cases, location information may or may not be recorded.

In some cases, authorization operations, communication operations, and/or power delivery operations are only performed before, during, or after a user pays a fee or promises to pay a fee.

In some cases, authorization operations, communication operations, and/or power delivery operations are only performed before, during, or after a user performs a distributed ledger transaction;

In some cases, authorization operations, communication operations, and/or power delivery operations are only performed before, during, or after In some cases, authorization operations, communication operations, and/or power delivery operations are only performed after the first authorization circuit and the second access circuit are coupled together electrically, electromechanically, or wirelessly.

In some cases, operations of the decentralized power architecture are performed to earn cryptocurrency.

In some cases, cryptocurrency is exchanged for power.

In some cases, carbon credits, carbon offsets, or other environmental parameters are associated with operations of the decentralized power architecture (DPA) 400.

In some cases, a digital wallet is associated with operations of the decentralized power architecture (DPA) 400.

In some cases, global position system (GPS) data is associated with operations of the decentralized power architecture (DPA) 400.

In some cases, a third party is a recipient of data associated with operations of the decentralized power architecture (DPA) 400. Sometimes the third party exchanges digital currency for such data.

In some cases, a utility such as a power company is arranged to sell power in micro-granular units via operations of the decentralized power architecture (DPA) 400.

In some cases delivery operations are only performed after a user interacts with a power receptacle via an interactive mechanism, consumes multimedia content (e.g., watches is a video advertisement, listens to an audio-only commercial, or the like) with a mobile computing device, and acknowledges that the multimedia content has been consumed.

Processing advances to 512.

At 512, if operations of the system are complete, processing ends at 514. Conversely, if operations of the system are to continue, processing returns to 504.

Figure 3:
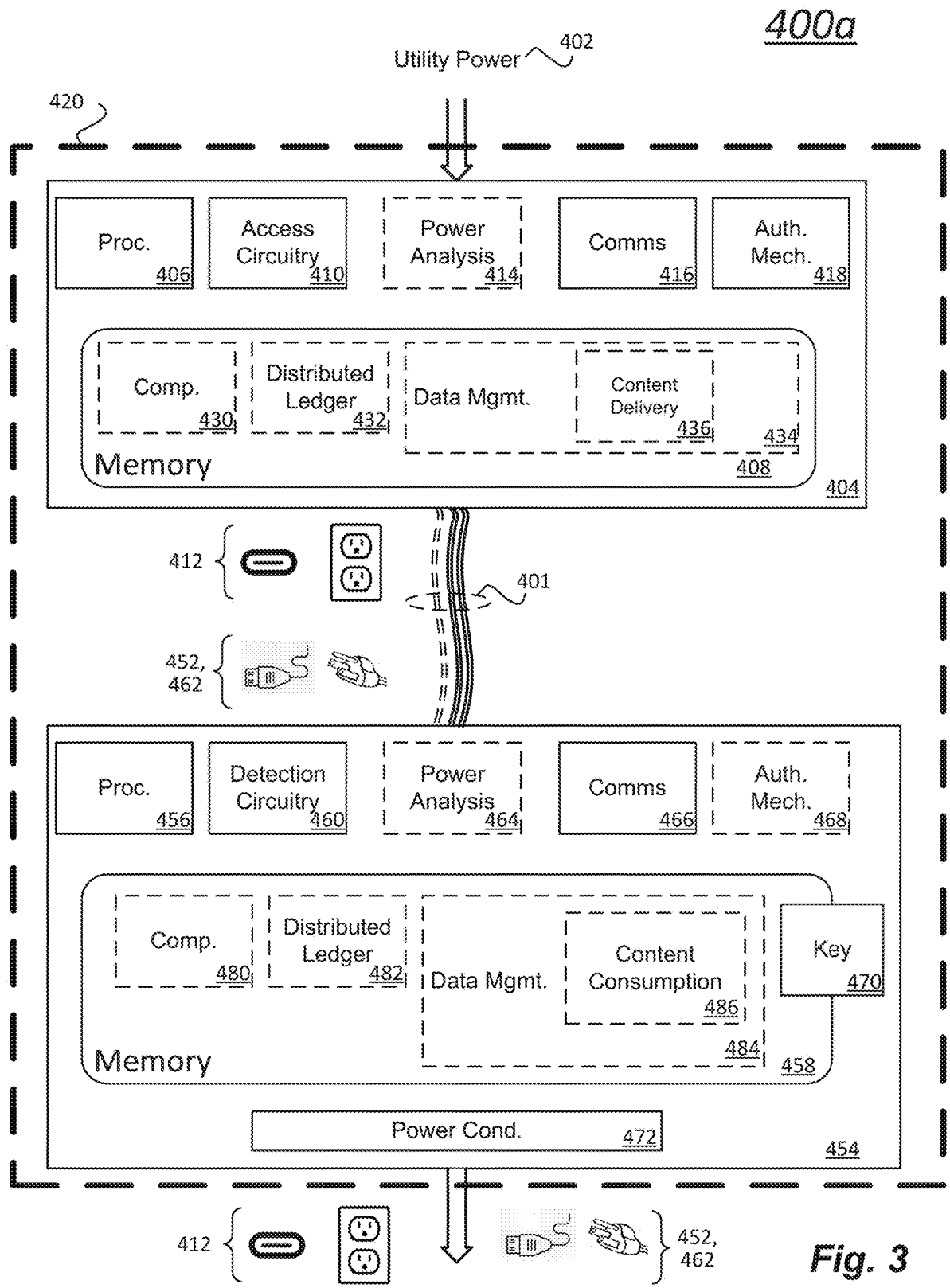
FIG. 3 is another system level deployment of a decentralized power architecture.

FIG. 3 is another system level deployment of a decentralized power architecture 400*a*. One of skill in the art will recognize that the architecture of FIG. 3 is along the lines of the architecture presented in FIG. 1. For brevity, same or substantially similar structures described with respect to FIG. 1 are not repeated in the description of FIG. 3.

In some cases, some or all of the circuits, structures, features, and other logic in the system level deployment 400*a* of FIG. 3 are contained in a single decentralized power architecture device 420. This device 420 may be installed in an airport, hotel, library, government building, store, or any other place of public accommodation. In some cases, for example, a power outlet of any type of configuration (e.g., AC line power, universal serial bus (USB) power, portable computing device DC power, and the like) is exposed to a user of a device that requires power. The user, via any suitable computing device is arranged to interact with one or more of the authorization mechanisms 418, 468, content delivery logic 436, content consumption logic 486, and other logic of the single decentralized power architecture device 420 to receive power.

In some cases, the authorization mechanism 418 of the first authorization circuit 404 and the authorization mechanism 468 of the second access circuit 454 cooperate to trigger the provision of certain electrical power 401 at the output 412 when a particular communication of data occurs such as a multimedia datum. In at least one embodiment, a user hears, views, or otherwise consumes multimedia content such as advertising content in at least one form in order to gain access to electrical power.

The cooperation between the authorization mechanisms 418, 468 may include electronic cooperation, computational cooperation, human input cooperation, mechanical cooperation, and electro-mechanical cooperation individually or in any useful combination. For example, in some embodiments, electronic signals may pass between the circuits. The electronic signals may be digital signals, analog signals, or digital and analog signals. The electronic signals may have certain timing, frequency, amplitude, current, phase, or other characteristics. The signals may include encoded data (e.g., password data, encryption keys, decryption keys, biometric data, or the like). In at least some cases, the cooperation may include simply the provision of multimedia content on one hand, and the consumption of that multimedia content on the other.

In another example, the authorization mechanism 418, the authorization mechanism 468, or both of the authorization mechanisms 418, 468 may include or otherwise direct the execution of software that permits or rejects the supply of power. Such computational cooperation may include programming that performs any one or more of retrieval, generation, analysis, and communication of codes, data, information, algorithms, and the like.

In some cases, the cooperation may include one or more proximity sensors, biometric sensors, buttons, fobs, dongles, tokens, or any other mechanical, electrical, or electromechanical devices that involve human input in one way or another. In at least one case, for example, the access to power is contingent on human action to plug in a cable (e.g., a traditional cable or a "special" cable that includes some or all structures of the second access circuit 454), bring a token (e.g., fob, dongle, or the like) into proximity of one or both of the first authorization circuit 404 and the second access circuit 454, press a button, flip a switch, provide wireless signal data (e.g., RF, WiFi, infrared, or the like), or take some other human action.

In at least one case, when a user that desires electrical power is proximate a power output 412 or in possession of or nearby a power sink device 452, the authorization mechanism 418 performs one or more actions that present a user with an opportunity to consume content (e.g., audio, video, or any multimedia). The content may include advertising or any other content. The content may include, but is not necessarily limited to, multimedia content. If the user accepts the opportunity, then the content is presented to the user, and after such presentation, the user is permitted to access the electrical power. Stated differently, in at least some cases, after the user consumes the multimedia content or performs some other interactive activation process, the DPA 400a electrically couples the input utility power 402, or some portion thereof, to the power output 412.

In some embodiments, the opportunity to consume content and the consumption of content occur proximate in time. For example, within fractions of a second, within seconds, or within just a few minutes. In other cases, a user may consume content at a first time (e.g., when the user is at work, at home, or at some other place) to earn credits or another accumulation or measure of value, and the user may later receive access to electrical power (e.g., at the airport, at the train station, on a transport (e.g., plane, train, boat, automobile, dirigible, or some other vessel), in a coffee shop, or in some other location) at a second time. In such cases, the first and second times may be seconds apart, minutes apart, hours apart, days apart, weeks apart, months apart, In some cases, the user may consume content and receive access to electrical power at the same place, and in other cases, the user may consume content and receive access to electrical power at different places.

The delivery of content may be facilitated by one or more of content delivery logic 436 and content consumption logic 486. The content delivery logic 486 may stream or otherwise directly communicate content in some cases, and the content delivery logic 486 may direct the communication of content (e.g., communicating an internet address, communicating a digital identifier, providing a signal in a wired or wireless manner (e.g., radio frequency (RF), light, sound, or the like), illuminating a computer or human perceptible indicator, or the like) in other cases. In some cases, the content delivery logic 436 includes a web hosting server arranged to deliver webpages. Those of skill in the art will understand that such content delivery logic 436 encompasses all manner of digital data communications across the Internet or other wide area network.

The consumption of content performed by the content consumption logic 486 may include operations of an internet browser, operations of an audio circuit, operations of a video circuit, or execution of some type of logic. In at least one case, the consumption of content includes watching, listening to, or watching and listening to multimedia content (e.g., an advertisement, a marketing message, a political message, taking a survey, answering questions, or the like). In at least one case, the consumption of content is one-directional (e.g., outbound from the user's device or inbound to the user's device), and in other cases, the consumption of content is bi-directional (e.g., interactive between the user and an authorization mechanism 418, 468).

In some cases, a user may gain access to electrical power at an output 412 via payment of money or something else of value (e.g., digital currency, performance of a task, or something else). In other cases, a user may gain access to power via performance an action (e.g., watching an advertisement, listening to an advertisement, taking a survey, providing personal information, providing rights to track, or the like).

Figure 4:
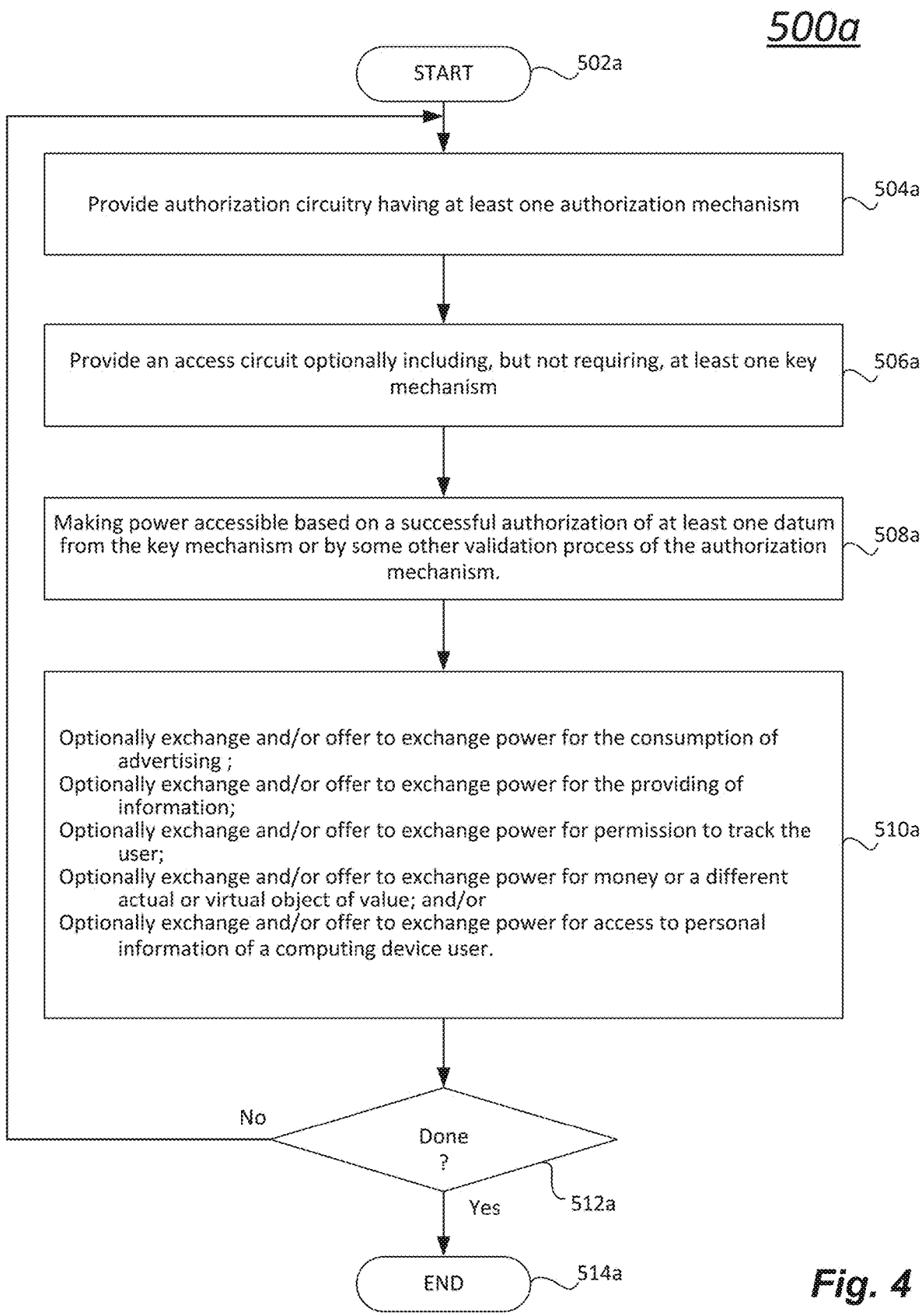
FIG. 4 is another data flow diagram of a decentralized power architecture method.

FIG. 4 is another data flow diagram of a decentralized power architecture method 500a. One of skill in the art will recognize that the acts of FIG. 4 are along the lines of the data flow diagram presented in FIG. 2. For brevity, same or substantially similar structures described with respect to FIG. 2 are not repeated in the description of FIG. 4. Processing begins at 502a.

At 504a, an authorization circuit is provided. The authorization circuit has at least one authorization mechanism. The authorization mechanism may carry out acts of providing a user with an opportunity to earn credit that can be exchanged for access to electrical energy (i.e., power) such as by consuming multimedia content or by some other means and further acts of verifying that the credit was earned such as by delivering multimedia for consumption by the user. In such cases, the multimedia content may be advertising, granting access to personal data, and the like. Other means are contemplated. Processing advances to 506a.

At 506a, an access circuit is provided. The access circuit optionally includes at least one key mechanism. In at least some cases, the access circuit is arranged to present multimedia for the user's consumption (e.g., audio, video, tactile output such as a buzzer or other vibratory device, and the like). Processing advances to 508a.

At 508a, based on a successful authorization of at least one datum from the key mechanism or by some other validation process of the authorization mechanism, electrical power become accessible to the power sink. Processing advances to 510*a*.

Optional processing at 510*a* may occur before power is delivered, after power is delivered, and while power is being delivered.

Optional processing may include optionally exchanging and/or offering to exchange access to electrical power in exchange for the consumption of advertising. The advertising may be in any form and cover any topic. In some cases, the advertising is in the form of audio information, still images, video, or any other type of multimedia. In some cases, the advertising may include print or otherwise displayed advertising. In such cases, for example, a user may be required to communicate some data (a number, a word, a description, an opinion, or the like) from the displayed advertising back to a certain entity. In still other cases, for example, a user may be required to communicate some data (a number, a word, a description, an opinion, or the like) from audio advertising back to a certain entity. The certain entity may be a provider of goods or services, an advertising agency, a political organization, or any other type of entity. In practice, the certain entity may include a computing server or some other circuitry that carries out the communications with the user or the user's device. In some cases, the advertising is directed to retail products, retail services, entertainment, commercial products and/or services, or some other topic. Other operational processing may also be performed.

Optional processing may include optionally exchanging and/or offering to exchange access to electrical power for the provision of information. The information in some cases is personally identifiable information (PII) as that term is generally known with respect to privacy law in the present jurisdiction. In these and other cases, the information may be tracking information (e.g., website visit information, or geographic region information). Other information is of course contemplated.

Optional processing may include optionally exchanging and/or offering to exchange access to electrical power for permission to track a user (e.g., capture information regarding websites a user visits, length of a website visit, "previous" web pages a user has visited, "next" web pages a user visited, and the like). Accordingly, the tracking information may be virtual information, digital information, physical location information (e.g., global positioning system (GPS) data from a global mapping service), virtual location information, or some other information.

Optional processing may include optionally exchanging and/or offering to exchange access to electrical power for money or a different actual or virtual object of value such as digital currency.

Optional processing may include optionally exchanging and/or offering to exchange access to electrical power for access to personal information of a computing device user.

Processing advances to 512*a*.

At 512*a*, if operations of the system are complete, processing ends at 514*a*. Conversely, if operations of the system are to continue, processing returns to 504*a*.

Figure 5:
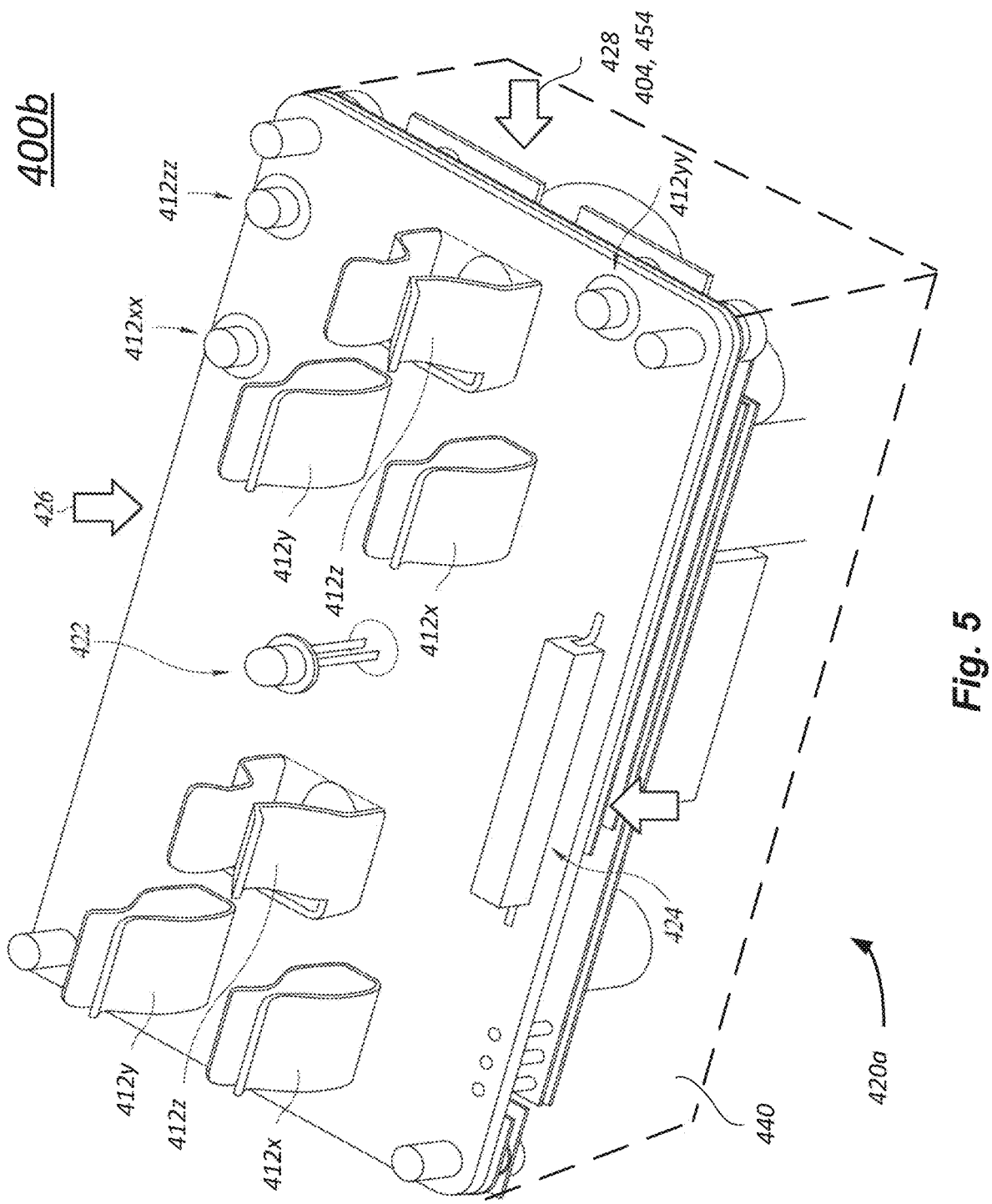
FIG. 5 is a rendering of a decentralized power architecture embodiment.

FIG. 5 is a rendering of a decentralized power architecture embodiment 400*b*. The device may also be referred to as a power receptacle device 420*a*. The decentralized power architecture embodiment 400*b* is along the lines of the decentralized power architecture embodiment 400 of FIG. 1, the decentralized power architecture embodiment 400*a* of FIG. 3, and other decentralized power architecture embodiments of the present disclosure. In at least one case, the decentralized power architecture embodiment 400*b* of FIG. 5 is arranged as a single-gang 110 VAC-120 VAC power outlet having an appearance that is in accordance with known U.S.-style Type B power outlets. See the embodiment of FIG. 9C, for example. Other configurations are of course contemplated including, but not limited to, Canadian-style outlets with Canadian standard voltages, Mexican-style outlets with Mexican standard voltages, European-country-style outlets with European-country standard voltages, Asian-country-style outlets with Asia-country standard voltages, Australian-style outlets with Australian standard voltages, African-country-style outlets with African-country standard voltages, South American-country-style outlets with South American-country standard voltages, and so on. In fact, there are no particular outlet styles or available electrical characteristics (e.g., voltages, currents, frequency, phase, and the like) including standardized protocol style outlets and standardized electrical characteristics, that are omitted from consideration.

As recognized by those of skill in the art, the output 412 structure of the decentralized power architecture embodiments 400, 400*a*, are represented in FIG. 5 as two sets of three-pin blade receiver structures, 412*x*, 412*y*, 412*z*, which in this embodiment represent a receiver for a hot blade, a neutral blade, and a ground blade of a corresponding input 462 (not shown in FIG. 5) that is arranged to plug into the output 412. The three-pin blade receiver structures, 412*x*, 412*y*, 412*z*, an indicator 422, an electronic switch 424, and interface points 412*xx*, 412*yy*, 412*zz* are mounted, coupled, or otherwise adjoined on, in, or through an interface board 426 in a mechanical way, an electrical way, or an electro-mechanical way. Further circuitry of the decentralized power architecture embodiment 400*b* is presented in FIG. 7 and in the discussion associated therewith.

In some embodiments, the decentralized power architecture embodiment 400*b* of the present disclosure is presented as a power receptacle device. The power receptacle device includes a housing 440 and a power receptacle contained in the housing 440. In some cases, such as in the embodiment of FIG. 5, the housing 440 is presented as a box or other structure having a chamber in which the circuitry of the decentralized power architecture embodiment 400*b* is contained. The housing may completely seal the circuitry in some cases. In other cases, however the housing 440 merely contains one or more portions of the decentralized power architecture embodiment 400*b* in an exposed way. For example in at least one case, the housing 440 is a rigid platform and the power receptacle and circuitry of the decentralized power architecture embodiment 400*b* our mounted on, integrated with insured alongside coupled to the rigid platform. In this and other embodiments, the housing 440 (e.g., a rigid platform) may include stamped, machined, or otherwise formed materials (e.g., steel, aluminum, a composite, or some other material) having tabs, notches, apertures, or other substructures arranged to mount the power receptacle device in an electrical junction box or other such structure.

Considering operations taught in the present disclosure, there are times when electrical power is available at an output 412, and times when power is not available at the output 412. In these cases, the one or more electronic switches 424, which may be reed switches, electronic relays, electromechanical relays, general purpose input/output contacts, or some type or types of switches, are arranged to selectively permit electrical power to reach the output 412 or prevent power from reaching the output 412. In at least one embodiment a controllable switch 424 is arranged between inline a mains power hot line. In at least one embodiment, a controllable switch 424 is arranged inline a V+ conduit of a universal serial bus (USB) line. In still other embodiments, one or more controllable switches 424 arranged to selectively make electrical power accessible to a user.

Considering the interface points 412xx, 412yy, 412zz, these points may be coupled to source power, utility power, or power of some other input to the decentralized power architecture embodiment 400b. Such input power may be passed directly from source power or otherwise derived from source power. In at least one case, for example, any suitable number of interface points form a power output 412 to which a derived power, such as a low voltage direct current (DC) power signal (e.g., USB five volt (5V), consumer electronic device six volt (6V), nine volt (9V), twelve volt (12V) or some other power signal is accessible. Those of skill in the art will recognize that the electrical power presented to an output 412 as contemplated herein may have any suitable electrical power characteristics (e.g., voltage, current, frequency, phase, or the like).

Indicator 422 may be a visual indicator such as an LED or other light source, a screen, or the like. In these and other embodiments, indicator 422 may be an audio device such as a piezo device, a speaker, a vibratory device, or some other indicator. In at least some cases, the indicator may alternatively or additionally be used as part of a communication mechanism between a first authorization circuit 404 and a second access circuit 454 (e.g., an antenna, a light communication circuit (e.g., infrared), or the like). The indicator may be used in a first mode to attract attention to the availability of power, a second mode to indicate when access to power will end, or for other reasons. The indicator may be "on," "off," or alternatively "on" and "off" such as when flashing. In at least one embodiment, indicator 422 is asserted when the decentralized power architecture embodiment 400b is in a control mode, operational mode, or the like. In at least one case, indicator 422 is asserted (e.g., illuminated, flashing, beeping, vibrating, or the like) to indicate that electrical power is accessible at the power receptacle. In still one more case, indicator 422 is asserted to indicate how much longer electrical power will be accessible at the power receptacle (e.g., less than 30 seconds, less than one minute, less than 5 minutes, more than 10 minutes, or some other measure of time).

A motherboard 428 is coupled to the interface board 426 communicatively, mechanically, electronically, or in any other suitable way. The mother board may be arranged to maintain any one or more circuits of the first authorization circuit 404 and the second access circuit 454. Further circuitry of the motherboard 428 is presented in FIG. 7 and in the discussion associated therewith. In at least some cases, the motherboard 428 and the housing 440 are formed as a single structure.

Figure 6:
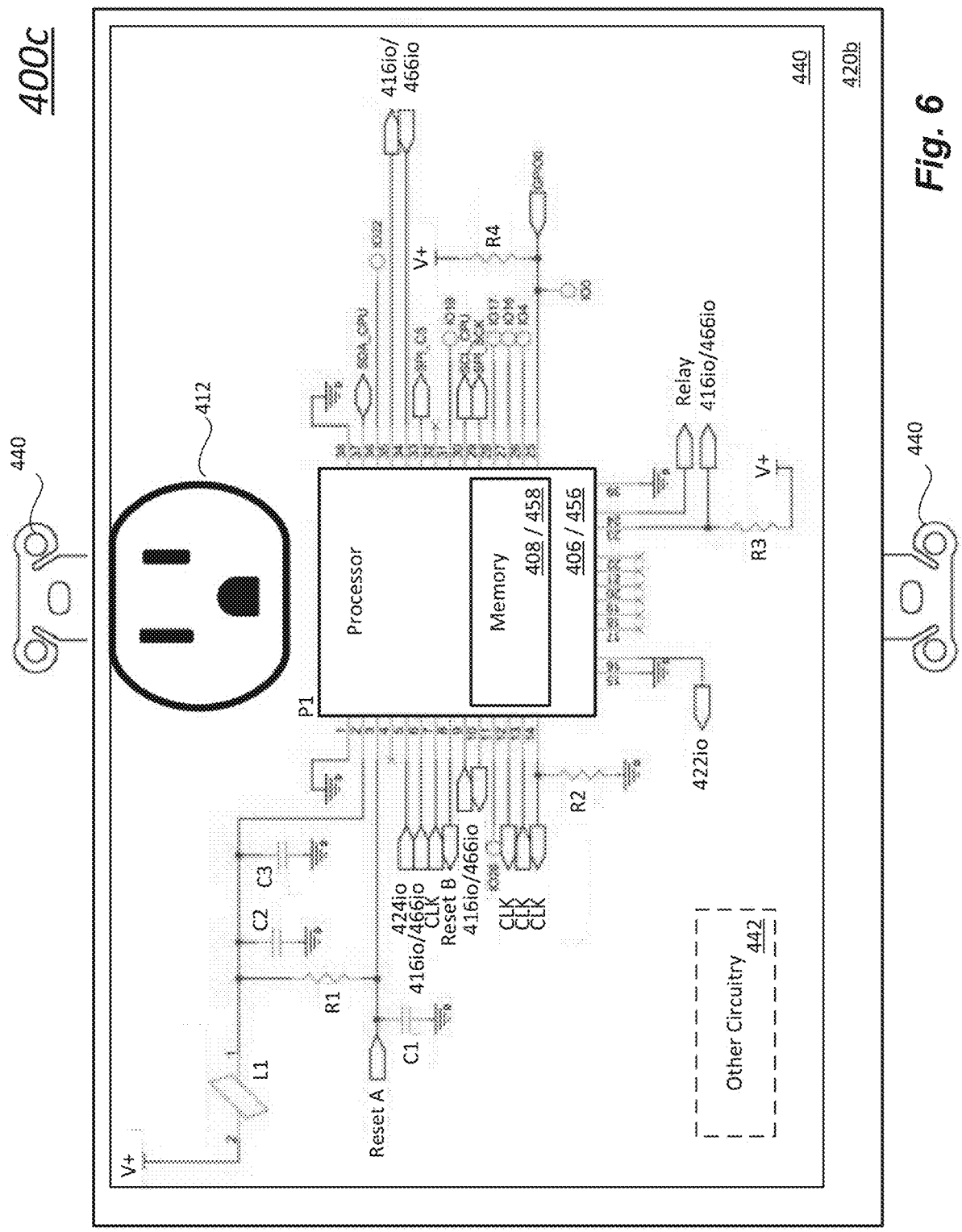
FIG. 6 is a schematic of a decentralized power architecture embodiment.

FIG. 6 is a schematic of a decentralized power architecture embodiment 400c. The device may also be referred to as a power receptacle device 420b. Certain components may be omitted for brevity and to avoid unnecessarily obfuscating the teaching of the present disclosure. The decentralized power architecture embodiment 400c is along the lines of the decentralized power architecture embodiment 400 of FIG. 1, the decentralized power architecture embodiment 400a of FIG. 3, the decentralized power architecture embodiment 400b of FIG. 5, and other decentralized power architecture embodiments of the present disclosure. In some cases, the circuitry of the decentralized power architecture embodiment 400c is arranged on the motherboard 428 (FIG. 5).

The decentralized power architecture embodiment 400c includes at least one processor 406/456. The processor 406/456 has access to memory 408/458, which may include onboard memory, external memory, or memory of any suitable type, location, and configuration. Software instructions executable in one form or another by the processor 406/456 are stored in the memory 408/458. The memory 408/458 may further include any suitable type of initialization data, temporary data, parameters, results of computation, and any other information. The execution of software by the processor 406/456 carries out the functions of the decentralized power architecture embodiments taught in the present disclosure.

In some cases, the processor 406/456 is a microcontroller. In some cases, the processor 406/456 is a system-on-chip (SOC). The processor 406/456 may have any suitable architecture, form, structure, and the like.

In at least some cases, the processor 406/456 is further arranged to include or otherwise direct communications infrastructure 416io/466io (e.g., wireless communications such as BLUETOOTH, WIFI, infrared, or the like, wired communications such as RS-232, universal serial bus (USB), and the like). The communications infrastructure 416io/466io may be arranged as first communications circuitry 416, second communications circuitry 466, or any other communications circuitry.

In at least some cases, the processor 406/456 is further arranged to include or otherwise direct operations of the indicator 422 (FIG. 5) via electronic switch input/output structures 422io.

In at least some cases, the processor 406/456 is further arranged to include or otherwise direct operations of the electronic switch 424 (FIG. 5) via electronic switch input/output structures 424io.

As evident in FIG. 6, there is additional logic integrated with the processor 406/456. Such additional logic, which includes clock circuitry, reset circuitry, input/output circuitry, and the like are arranged to participate, or otherwise cooperate, with the access circuitry 410, detection circuitry 460, power analysis circuitry 414, 464, authorization mechanism circuitry 418, 468, content delivery logic 436, content consumption logic 486, distributed ledger logic 432, 482, keys 470, and other structures and features of a decentralized power architecture.

In some cases, the decentralized power architecture embodiment 400c optionally includes other circuitry 428. The other circuitry 428 may include location circuitry (e.g., global positioning system (GPS) circuitry, a unique location code, or the like), communication circuitry (e.g., cellular communication circuitry, power line communication (PLC) circuitry, or some other circuits), and still other circuitry. In at least one case, each decentralized power architecture embodiment 400c is able to self-report its location, condition, status, use, and other information to a remote computing device. The power consumption alone or in combination with other data may be monitored in real-time, delayed-time, on a schedule, or by some other scheme for communication to the remote computing device. Such communication may be bidirectional or unidirectional. In some cases, each decentralized power architecture embodiment 400c may take direction from the remote computing device (e.g., turn on, turn off, set prices for power, download content or updated directions to access new content, and any other suitable direction).

The decentralized power architecture embodiment 400c of FIG. 6 is contained in, on or with a housing 440. In some cases, the housing 440 includes a chamber or well arranged to contain some or all of the circuitry of the decentralized power architecture embodiment 400c. In other cases, the housing 440 includes simply a frame to which some or all of the decentralized power architecture embodiment 400c is mounted.

Figure 7:
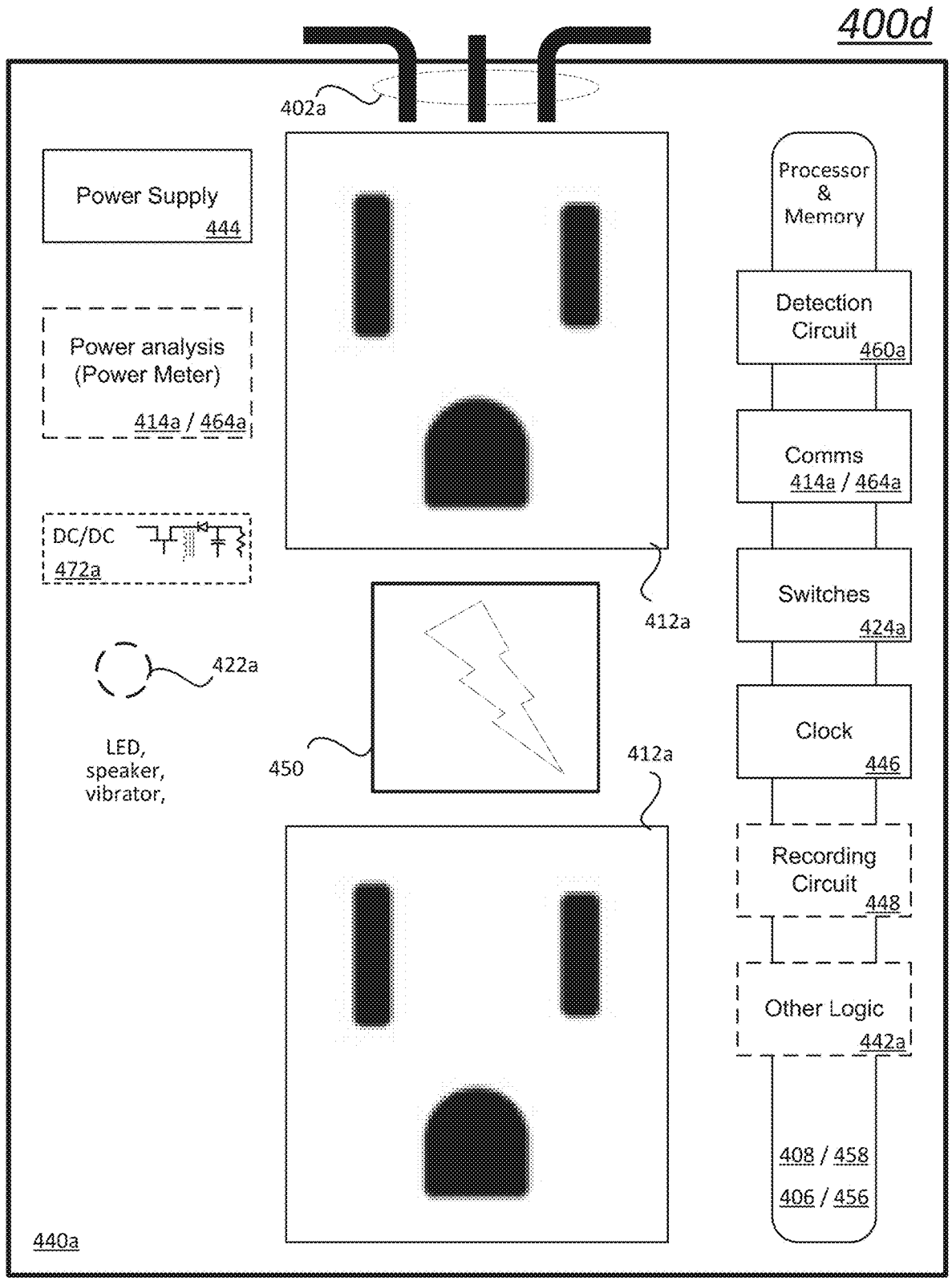
FIG. 7 is yet one more decentralized power architecture embodiment.

FIG. 7 is yet one more decentralized power architecture embodiment 400d. The architecture of FIG. 7 is arranged as a power receptacle device. In the embodiment, two power receptacles 412a are contained in a housing 440a. The housing 440a may have any suitable size, shape, or configuration, in the housing 440a may be arranged different or same as any other housing of the present disclosure.

The decentralized power architecture embodiment 400d includes an input structure to receive utility power 402a. The utility power 402a may be mains power or some other input power. The input power structure may be arranged as electrically conductive conduit (e.g., wire, insulated copper wire, jacketed cable, or some other conductive conduit), lugs, terminals, screws, ports, or some other input power structure means.

The decentralized power architecture embodiment 400d also includes at least one power receptacle 412a contained in the housing 440a. One of skill in the art that the power receptacles 412a being contained in the housing 440a includes any suitable containment (e.g., mounted on, mounted in, mounted through, integrated with, or coupled in any other way, and such coupling may include electrical coupling, mechanical coupling, and electromechanical coupling).

Between the input structure that receives utility power 402a in the power receptacles 412a, the decentralized power architecture embodiment 400d includes power supply circuitry 444, and, optionally, power analysis circuitry 414a, 464a, (e.g., power metering circuitry) and power conditioning circuitry 472a.

The power supply circuitry 444 is arranged to convert input power such as utility power 402a 2 a power signal useful to energize the electronic circuitry of the decentralized power architecture embodiment 400d. For example, the power supply circuitry 444 may be used to convert a power signal having the characteristics of 100 VAC to 240 VAC, single phase, and 50 Hz to 60 Hz, to a derivative power signal having the power characteristics of 3 VDC to 5 VDC.

The power conditioning circuitry 472a may be along the lines of the power conditioning circuitry 472 of FIGS. 1, 3. Alternatively, or additionally, the power conditioning circuitry 472a may operate differently. In the embodiment of FIG. 7, the power conditioning circuitry 472a includes a DC/DC arranged to provide power compatible with a standardized protocol such as a universal serial bus (USB) protocol. Other standardized and proprietary protocols are within the scope of the present disclosure. In at least one case, the power conditioning circuitry 472a includes circuitry expressly arranged to fast-charge in accordance with a proprietary or standardized rechargeable battery protocol (e.g., APPLE product power supply, SAMSUNG product power supply, or some other power supply particularly suited to fast-charge a certain rechargeable battery type).

The decentralized power architecture embodiment 400d includes a processor 406, 456 and memory 408, 458 of the type described in the present disclosure. The processor 406, 456 and memory 408, 458 may be arranged to perform same operations, different operations, or alternate operations described with respect to the other decentralized power architecture embodiments of the present disclosure. The decentralized power architecture embodiment 400d includes communications circuitry 414a, 464a, switch circuitry 424a, clock circuitry 446, and detection circuitry 460a. Optionally, the decentralized power architecture 400d may also include recording circuitry 448 and other logic 442a. The structures described herein of the decentralized power architecture embodiment 400d may include circuitry, software instructions, The decentralized power architecture embodiment 400d optionally includes an indicator 422a. The indicator 422a may be a visual indicator such as an LED, a speaker, a vibrator, or some other type of indicator. The indicator 422a may be along the lines of indicator 422 (FIG. 5). In some cases, indicator 422a is directed to represent a particular status of the decentralized power architecture embodiment 400d.

The decentralized power architecture embodiment 400d includes and activation interface 450. The activation interface 450 is arranged to permit a user to interact with the power receptacle device or a remote computing server associated with the power receptacle device so as to receive at and output 412a of the power receptacle device.

In some cases, the activation interface 450 is a printed interface (e.g., barcode, quick response (QR) code, identification number, alphanumeric identifier, or the like). In some cases, the activation interface 450 is an electronic interface (e.g., near field communication (NFC) circuit, audio circuit, infrared circuit, or some other electronic interface means). In still other cases, the activation interface may include some other electrical, mechanical, computational, or other means of engaging with a user.

A first operational embodiment of the decentralized power architecture 400d of FIG. 7 is now described. Other operational embodiments are of course contemplated.

In the operational embodiment, a power receptacle device is provided. The power receptacle device includes a housing 440, and the two power receptacles 412a are contained in the housing 440. A globally unique identifier (GUID) is associated with at least one of the power receptacles 412a. Optionally, the GUID may be associated with both of the power receptacles 412a or any or all of the power receptacles 412a contained in the housing 440. The GUID is used in the system embodiment to enable access to electrical power at a power receptacle 412a, and in some embodiments, all power receptacles 412a are enabled or disabled together (i.e., all share a common GUID). Alternatively, each or some subset of all power receptacles 412a have their own associated GUID, which permits selective enabling or disabling of individual power receptacles of small subsets of power receptacles. In one case, for example, if a power receptacle device of the type represented in FIG. 7 is provided in an airport, two separate users (e.g., two different airline passengers) may plug there electronic device into a different one of the two power receptacles 412a. In some cases, a single user may perform interactive acts with the power receptacle device to enable a provision of accessible electrical power at both power receptacles 412a concurrently; in other cases each user may be required to perform interactive acts with the power receptacle device to enable a provision of accessible electrical power at respective power receptacles 412a.

Further in the operational embodiment, an input power interface 402a is arranged to receive mains input power having particular characteristics (e.g., 100 VAC, 60 Hz) into the power receptacle device. For example, the power receptacle device may have a form factor along the lines of a conventional duplex power outlet, and in this respect, the inventive power receptacle device of FIG. 7 may be wired into a conventional electrical junction box deployed in any particular conventional location (e.g., airport terminal, train station, bus station, theme park, hotel, motel, convention center, food establishment, drink establishment, store, service center, office building, vehicle of any type or other mode of transportation, place of public accommodation, or the like). One of skill in the art will recognize that the inventive power receptacle devices introduced in the present disclosure may take any suitable form factor, may provide power of any desirable electrical characteristics, and may be installed in any location where it is desired that the provision of electrical power is controlled.

A controllable switch 424a is electrically coupled between the input power interface 402a the power receptacle 412a. In the present embodiment, the controllable switch 424a is biased to an open configuration that prevents electrical power from being accessible at the power receptacle 412a until certain acts are performed by a user. In other cases, the controllable switch 424a is biased into a closed configuration on certain days, on certain times of day, for limited periods of time, or in accordance with other parameters. If the power receptacle device is installed in a café, for example, a proprietor of the café may desire that customers to the café are permitted to immediately access electrical power for a short time (e.g., 5 minutes, 10 minutes, 30 minutes, or some other period of time), but at the expiration of the short period of time, the controllable switch is directed into an open state thereby cutting off electrical power to the customer. To regain access to electrical power, the customer may be required to purchase a product, purchase a credit for power, watch an advertisement, or perform some other operational acts.

The power receptacle device of the present operational embodiment now being described includes an activation interface 450 and a processor 406, 456 of the types described herein. The processor 406, 456 is arranged (e.g., via execution of programming instructions stored in memory 408, 458) to receive a power activation signal and, based on the power activation signal, temporarily direct the controllable switch 424a to pass power to the power receptacle 412a. The power activation signal is received after a user performs at least one confirming act associated with the GUID of the particular power receptacle 412a. In some cases, the power activation signal is received only after the user performs the at least one confirming act.

In the operational embodiment now being described, a user interacts with the activation interface 450 using a smartphone. The interaction may include, for example, the user using a camera of the smartphone to capture an image of a QR code activation interface 450 printed on, adhered to, or otherwise presented proximate the power receptacle device. Upon capturing the image, or otherwise scanning the activation interface 450, an Internet browser of the smartphone has presented thereon certain multimedia content. The multimedia content is provided by a remote computing server. Upon consuming the multimedia content through the Internet browser, the remote computing server directs a power activation signal toward a local bridge device (not shown in FIG. 7) located proximate the power receptacle device. The local bridge device is arranged to receive communications from the remote computing server, and the local bridge device is further arranged to transmit communications toward the power receptacle device. Upon receiving the power activation signal at the power receptacle device (or at the power receptacle 412a), the processor 406, 456 directs the controllable switch 424a to permit power to be accessible at the power receptacle 412a.

As described herein, with respect to this operational embodiment, the input power may be mains power, or, alternatively, the input power may be direct current (DC) power at a voltage of between 5 VDC and 50 VDC provided by power conditioning circuitry 472a. Accordingly, the power receptacle 412a may be arranged to receive conductive portions of a standardized power cord (e.g., a standardized power cord conforming to a household wiring protocol), or, alternatively, the power receptacle 412a may be arranged to receive conductive portions of a power cord that conforms to a universal serial bus (USB) protocol or some other standardized or proprietary protocol.

With further respect to the operational embodiment now being described, the power receptacle device may also include a clock circuit arranged to provide a time-base for measuring how long the controllable switch 424a will permit power to be passed to the power receptacle 412a. For example, the clock circuit may be arranged to direct the controllable switch 424a to pass power to the power receptacle 412a for between about 5 minutes and about 256 minutes, though other time values or time windows are of course contemplated.

And with still further respect to the operational embodiment now being described, the power receptacle device may also include power meter circuitry 414a, 464a arranged to measure the amount of power passed at any given time through the power receptacle 412a. In this way, power may be saved, generated heat may be reduced, climate change may be mitigated, or other benefits may be realized.

FIGS. 8A-8D are an embodiment of a decentralized power architecture use case 600a. For brevity, FIGS. 8A-8D are a related set of figures that may be individually or collectively referred to as FIG. 8.

In FIG. 8, a user in possession of a mobile computing device 602 (e.g., a smartphone, a tablet computer, a laptop computer, or some other mobile computing device) is in a location where a particular decentralized power architecture embodiment (e.g., a power receptacle device 420a, 420b or the like) is deployed. In this case, the decentralized power architecture embodiment is along the lines of the single decentralized power architecture device 420 of FIG. 3 and the decentralized power architecture embodiments 400a, 400b of FIGS. 5-6. The location may be an airport, hotel, library, government building, store, or any other place as described herein such as a place of public accommodation. Additionally, or alternatively, the location may be a private business, home, or any other location where an entity in a position to provide electrical power would like to monetize or otherwise exchange electrical power for some object or service of value.

Figure 8B:
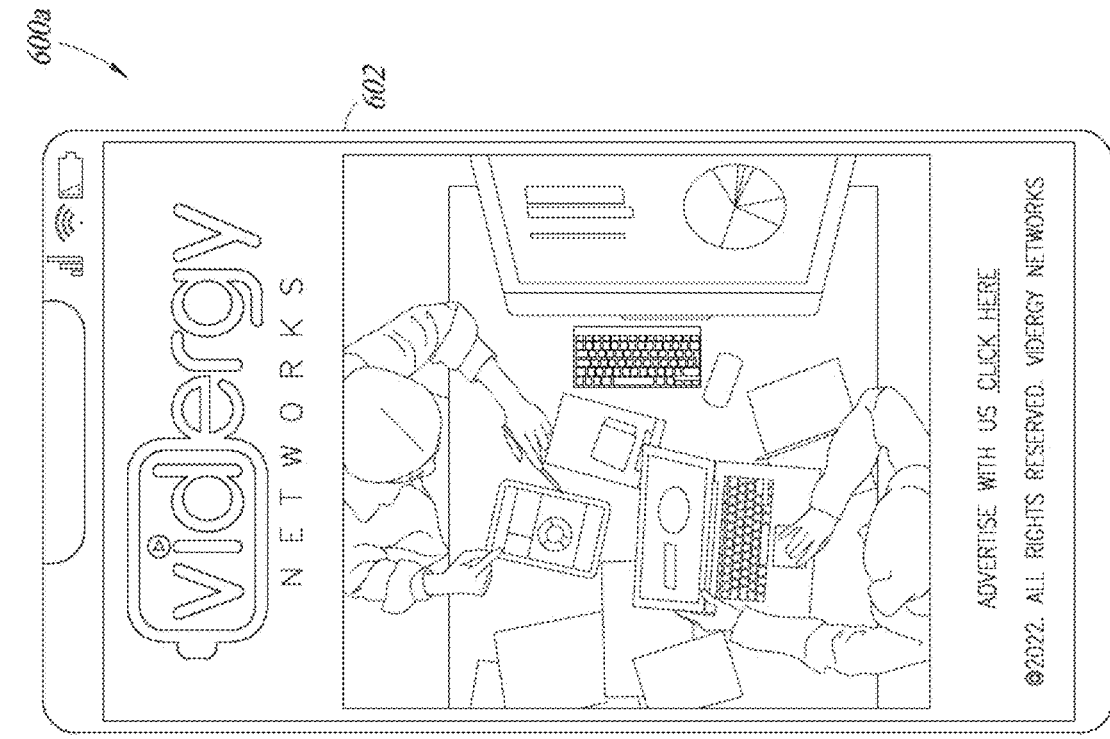
FIGS. 8A-8D are an embodiment of a decentralized power architecture use case.
Figure 8A:
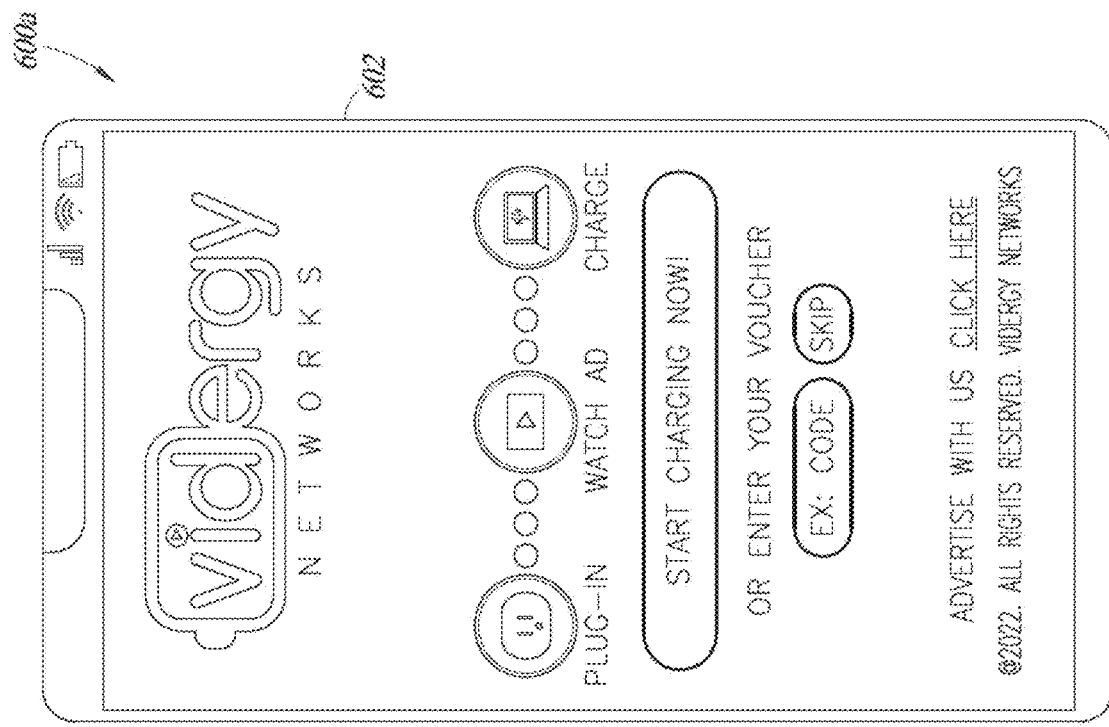

In FIG. 8A, the user engages information on the display of the mobile computing device 602. The information may be presented by a recognition that a power cord 462 has been plugged in between the single decentralized power architecture device 420 and the mobile computing device 602. Additionally, or alternatively, the information may be directed by operations of the user engaging with the mobile computing device 602 such as by surfing to a certain web page, searching for available network connections (e.g., WiFi), clicking an icon, scanning or entering an encoded datum, or taking any other action to engage with an activation interface 450 and thereby initiate the sequence of events that lead to the information being displayed of the mobile computing device 602.

In FIG. 8A, the user is informed of a sequence of acts the user may perform to receive power. A first act optionally includes the user plugging a power cord in between the single decentralized power architecture device 420 and the mobile computing device 602. The power cord may include a power conversion device (e.g., AC-to-DC power supply, a USB cord, a wireless inductive or electromagnetic power pad, or any other power communication medium). Alternatively, the first act may include the user interacting with an activation interface 450 as described in the present disclosure. A second act includes the user consuming certain content, which in FIG. 8A is referred to as "watch[ing] [an] ad[vertisement]." Other actions are of course contemplated. This second act may in some cases be referred to as an exchange of something of value in return for receiving power. When the user watches the ad or otherwise consumes the multimedia or otherwise performs the second act, the third act is the user receiving power to charge a battery of his mobile computing device 602.

In at least some cases, the second act (i.e., watching an advertisement) may be replaced by an alternate exchange of some object or service of value. Power may be earned in another way such as by filling out a survey, sharing personal information, agreeing to be tracked, paying money, or by performing some other act. In FIG. 8A, the alternate exchange of some object or service of value includes entering a voucher code. The voucher code may be, for example, provided by a company advertising its products, a prize in an competition, a reward, or any other voucher code.

In FIG. 8B, the user has plugged his mobile computing device 602 into a power outlet of the single decentralized power architecture device 420, and the user has agreed to watch an advertisement. Plugging in and receiving power from the single decentralized power architecture device 420 may or may not be a prerequisite to subsequent acts of the operational embodiment. The advertisement is presented in a display area of the mobile computing device 602 (e.g., an internet browser window); the advertisement may include audio, video, tactile action, or any other suitable content.

Figure 8D:
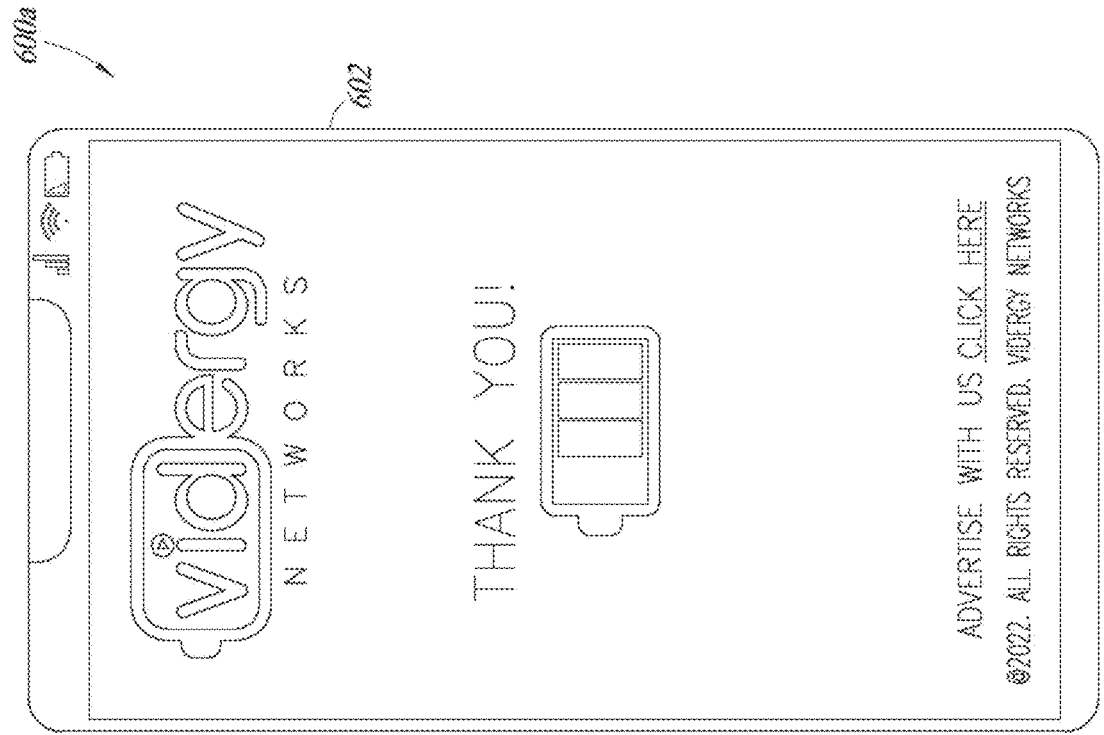
Figure 8C:
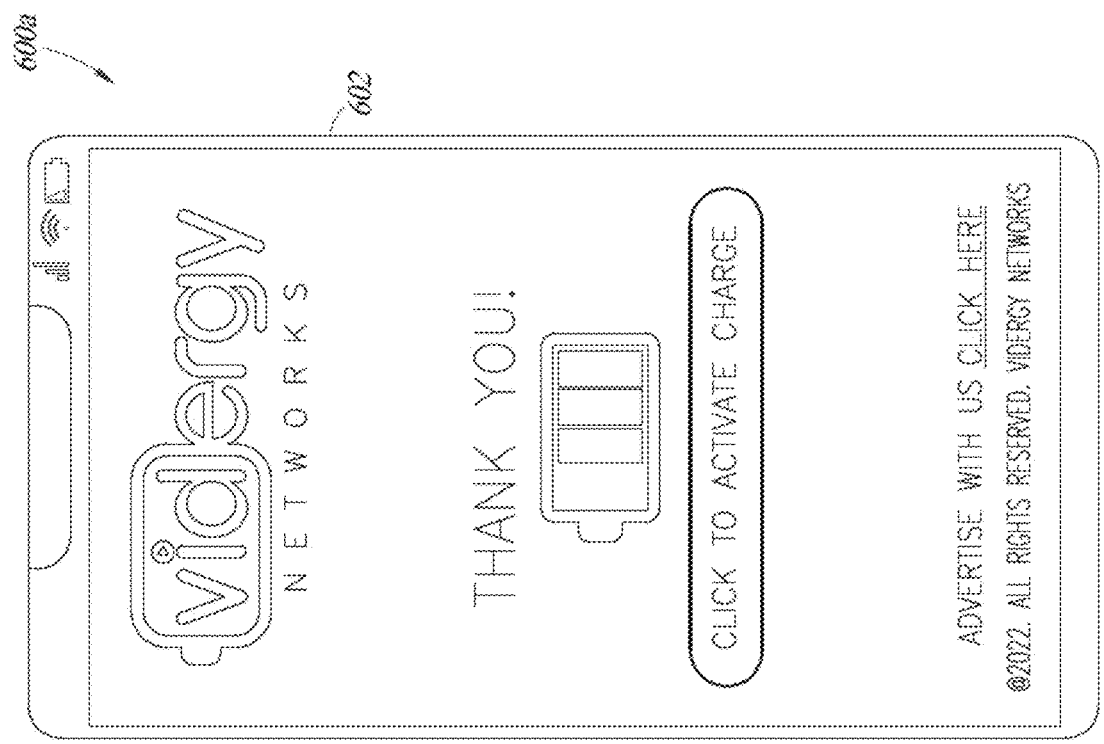

In FIG. 8C, the user has consumed the content (e.g., viewed the advertisement), and the user is provided an opportunity to begin receiving power (e.g., "CLICK TO ACTIVATE CHARGE"). In other cases, charge may begin automatically or by taking any other suitable action. In at least some cases, the detection circuit 460 is arranged to determine when a devices plugged into a power receptacle 412a, in the provision of power is further directed by an output signal from the detection circuit 460.

In FIG. 8D, the user has plugged his mobile computing device 602 into the power receptacle 412a of the single decentralized power architecture device 420, and the mobile computing device 602 is receiving charging power. The amount of charge may be based on time as directed by clock circuitry 446 (e.g., 30 seconds, five minutes, twenty minutes, or any other suitable time), based on volume of charge delivered based on charge measured by power metering circuitry 414, 464 (e.g., 20 milli-amp-hours (20 maH), 100 maH, or some other volume of charge), based on action of the user as indicated by detection circuitry 460 (e.g., unplugging the mobile computing device 602 from the power outlet of the single decentralized power architecture device 420) or by taking some other action.

Figure 9B:
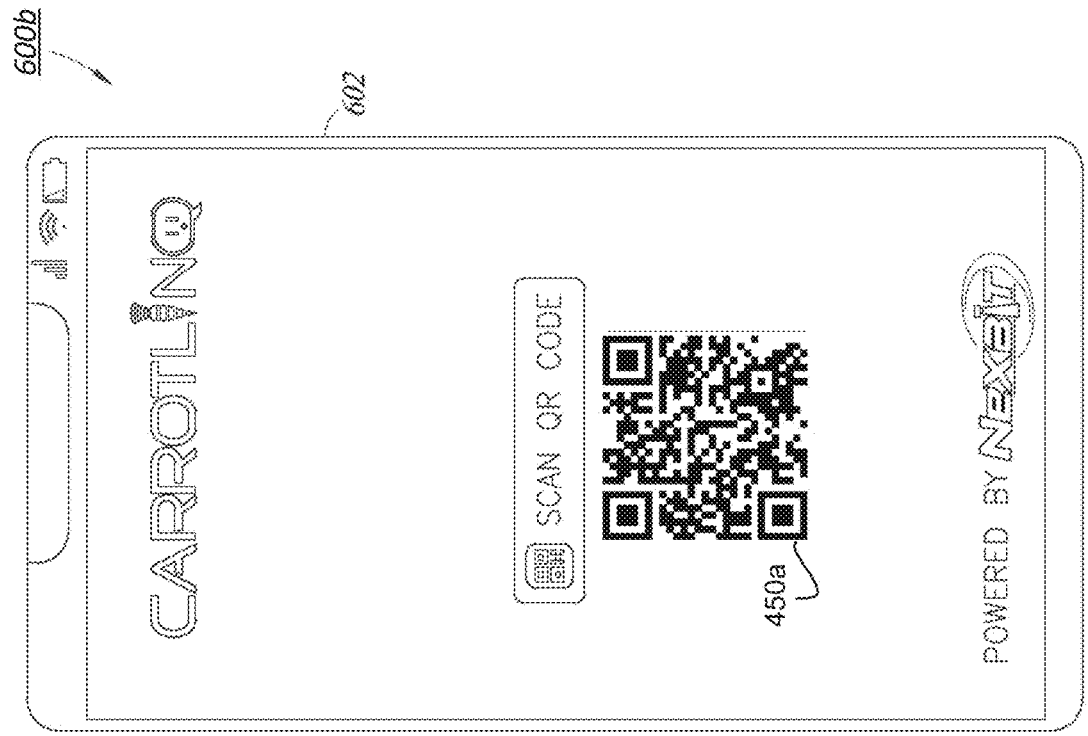
Figure 9A:
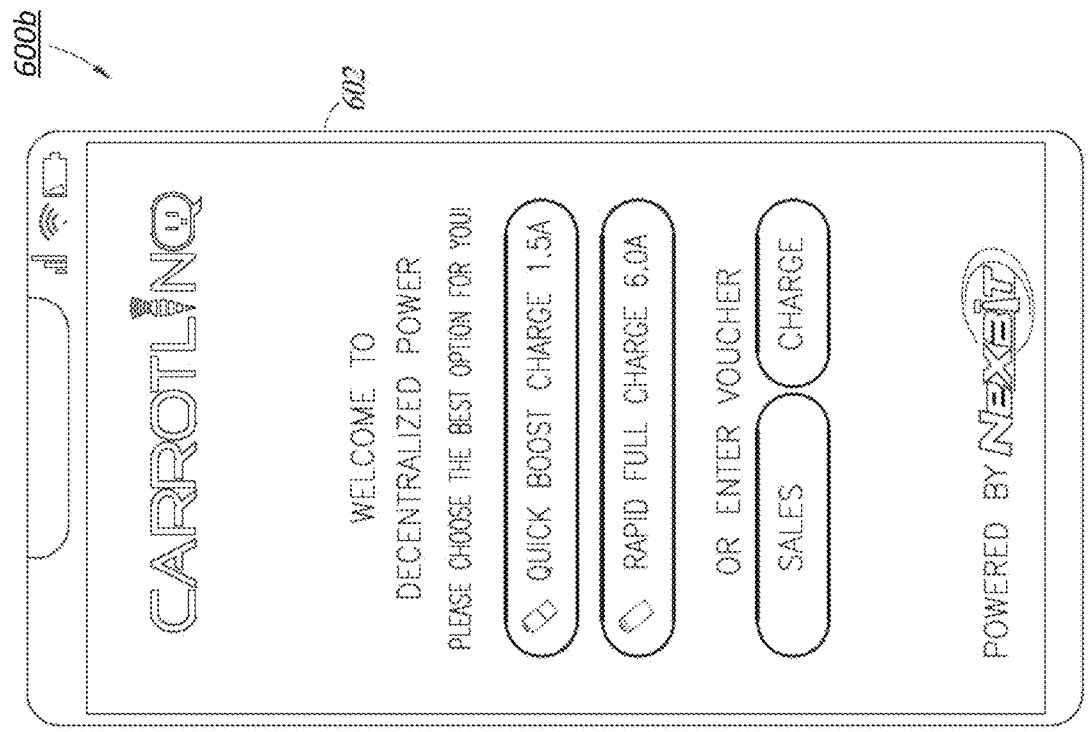

FIGS. 9A-9C are yet one more embodiment of a decentralized power architecture use case 600b. For brevity, FIGS. 9A-9C are a related set of figures that may be individually or collectively referred to as FIG. 9.

In FIG. 9, a user in possession of a mobile computing device 602 is in a location where a particular decentralized power architecture embodiment is deployed. As in the operational embodiment of FIG. 8, the decentralized power architecture embodiment is along the lines of the single decentralized power architecture device 420 of FIG. 3 and the decentralized power architecture embodiments 400a, 400b of FIGS. 5-6. The location may be any location where an entity in a position to provide power would like to monetize or otherwise exchange power for some object or service of value.

In FIG. 9A, the user engages information on the display of the mobile computing device 602. The presentation of the information may be caused by any means (e.g., recognizing that a power cord 462 has been plugged in, the user surfing to a certain web page, the user scanning a code, a beacon or other wireless connection being made, or by some other means.

In FIGS. 9A and 9B, the user is informed that power may be received by entering a voucher code, scanning an image or other activation interface 450 with the mobile computing device 602 (e.g., bar code, QR code, or some other image), or by some other act. of a sequence of acts the user may perform to receive power.

FIG. 9C is an advertisement 500a teaching a user of a mobile computing device 602 or any other device that consumes electricity how power might be accessed from a particular power receptacle device 420a. An embodiment of single decentralized power architecture device 420a has an image (i.e., a QR code), which may be captured by a camera of the mobile computing device 602. Upon capturing the image, the user's mobile computing device 602 may be directed to perform acts as taught in the present disclosure to receive access to power.

In FIG. 9C, the user has agreed to watch an advertisement, and the advertisement is presented in a display area of the mobile computing device 602. In FIG. 9, power is delivered from the output 412 of the single decentralized power architecture device 420.

Figure 10:
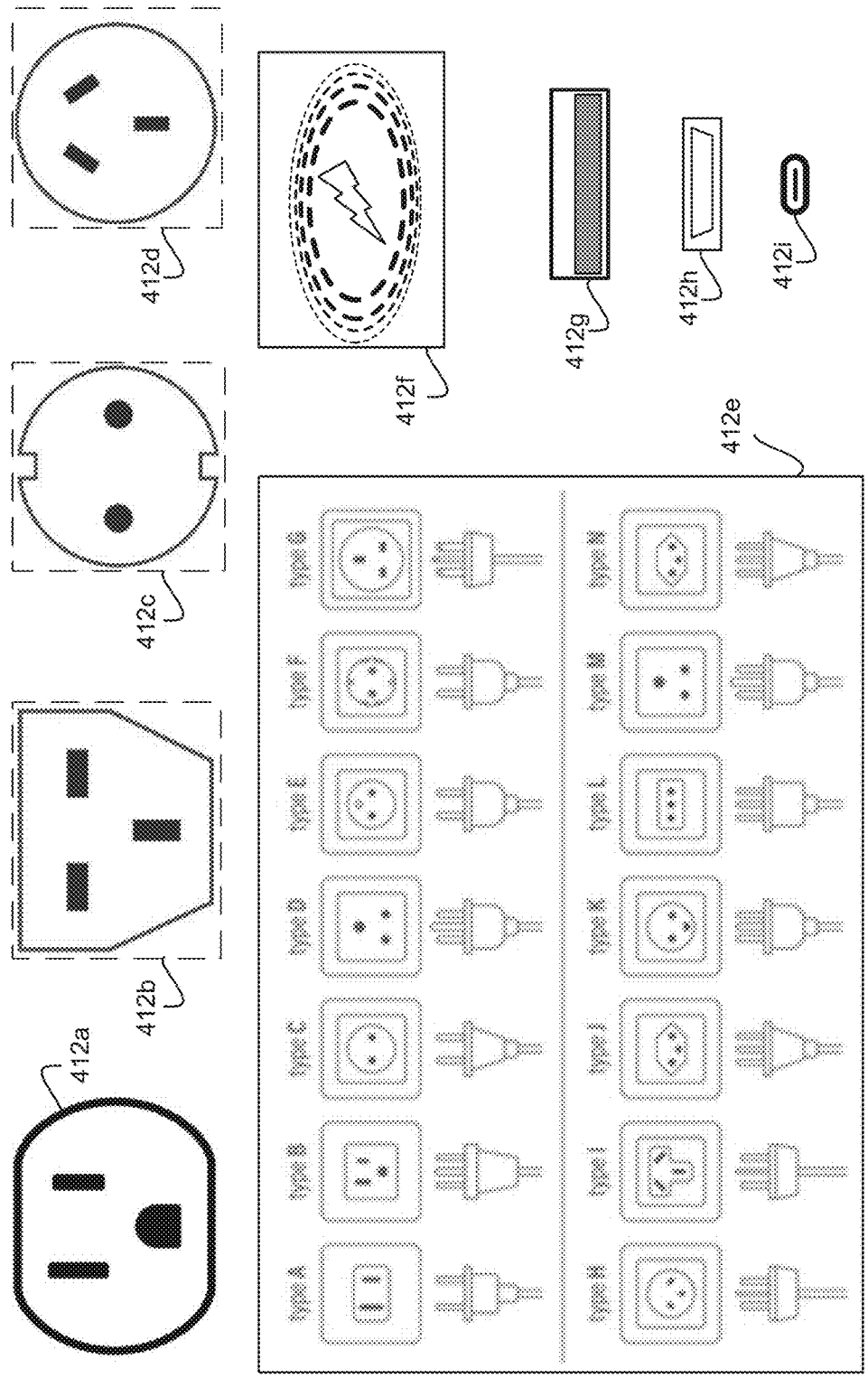
FIG. 10 is a set of exemplary power receptacles and a set of exemplary activation interface.
Figure 10:
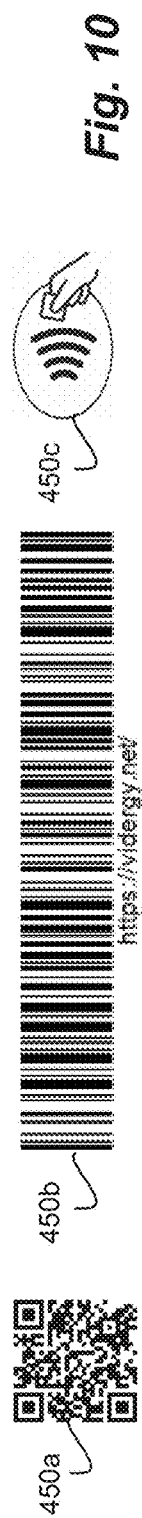

FIG. 10 is a set of exemplary power receptacles 412 and a set of exemplary activation interfaces 450. One of skill in the art will recognize that power receptacle structures of the present disclosure can take any suitable shape, form factor, size, and the like. A power receptacle can deliver power having any particular electrical characteristics. Power receptacle 412a is a first Type B socket, which is generally known and deployed in the United States to provide a 110 VAC consumer-level power interface. Power receptacle 412b is a Type G socket, which is generally known and deployed in the United Kingdom. Power receptacle 412c is a Type C socket, which is generally known and deployed in the European Union. Power receptacle 412d is a Type I socket, which is generally known and deployed in Australia. Other power receptacles 412e are known and deployed in other geographic regions around the world. Power receptacle 412f is a wireless charging power delivery mechanism. Power receptacle 412g is a universal serial bus (USB) Type A socket. Power receptacle 412h is a USB Mini B or USB Micro B socket. And power receptacle 412i is a USB Type C socket. Other types of power receptacles are contemplated. For brevity, and to reduce complexity, a power receptacle of any type and characteristics may be referred to herein as a power receptacle 412.

Two interactive interfaces 450 are shown in FIG. 10. A first interactive interface 450a is a quick response (QR) code. A second interactive interface 450b is a bar code, and a third interactive interface is an embedded near field communications (NFC) circuit arranged to communicate with a smart card or other NFC circuit. Other interactive interfaces may include biometric structures, physical structures, Braille structures, mechanical structures, magnetic structures (e.g., "mag-stripe," card reader, or the like), passwords, encryption technology mechanisms, and the like. Still other interactive interfaces 450 are contemplated. For brevity, and to reduce complexity, an interactive interface of any type and characteristics may be referred to herein as an interactive interface 450.

Figure 11:
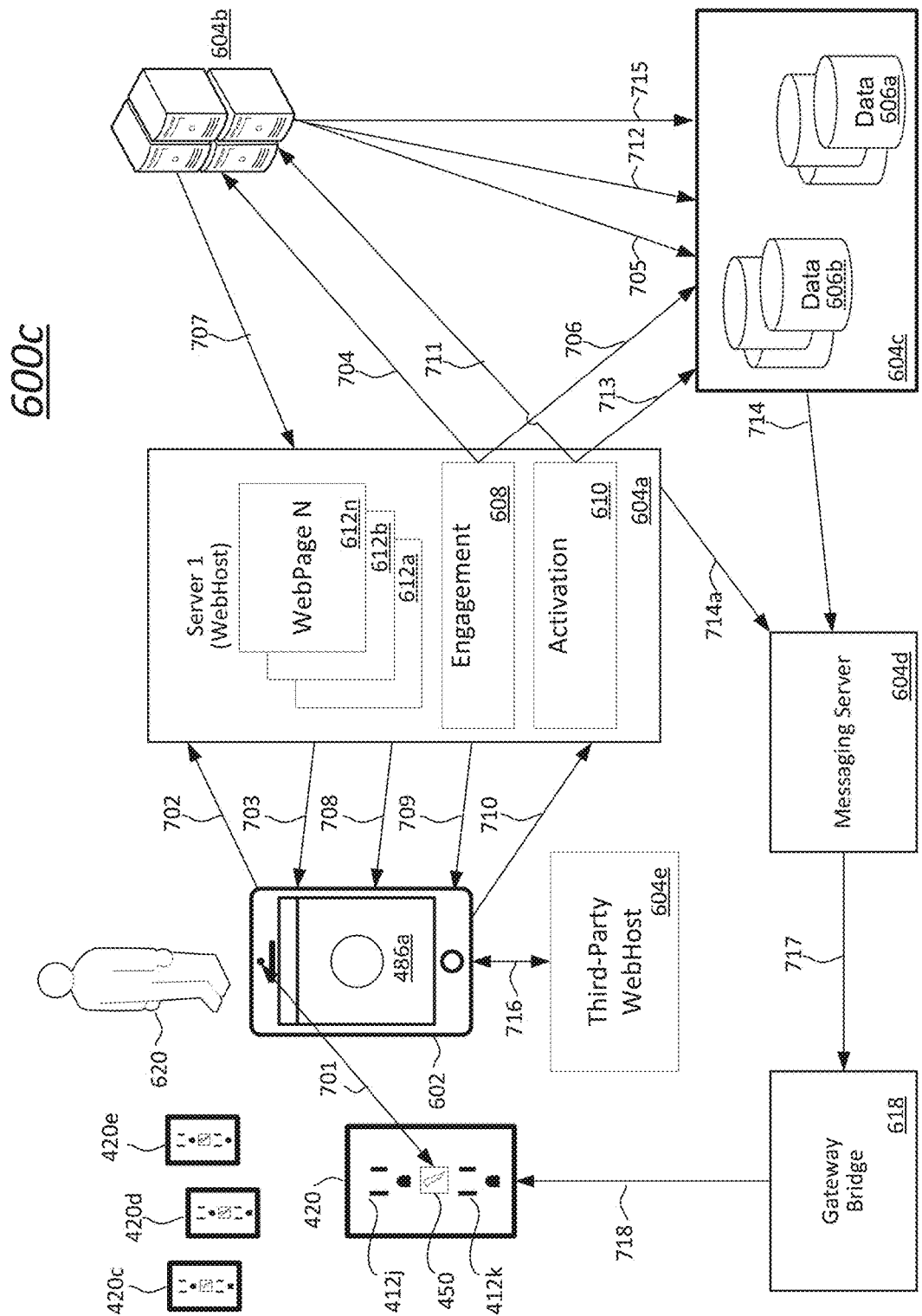
FIG. 11 is a schematic and data flow embodiment of a decentralized power architecture system and method.

FIG. 11 is a schematic and data flow embodiment of a decentralized power architecture system and method 600c. In some instances, the embodiment of FIG. 11 provides a computer-implemented method to deliver power through a power receptacle 412 to an electrically powered device (e.g., a power sink, an input 462, or the like) that is electromechanically coupled to the power receptacle 412. In other instances, the embodiment of FIG. 11 provides a system to temporarily deliver power through a power receptacle 412 to the electrically powered device.

In the embodiment, a plurality of power receptacle devices 420 are arranged in a first geographic area. The first geographic area may be any geographic area as described in the present disclosure, but the first geographic area is not limited to only those locales, establishments, businesses, buildings, or the like that are described in the present disclosure.

Each of the power receptacle devices 420 is arranged along the lines of other power receptacle devices 420 described in the present disclosure. That is, embodiments of these power receptacle devices 420 include a housing 440, at least one power receptacle 412 contained in the housing 440, a globally unique identifier (GUID) stored in the respective power receptacle device 420 (e.g., in memory 408, 458, in circuitry, or the like) or in some other way associated therewith.

A GUID is used in the present disclosure may be any suitable identifier of a particular power receptacle device 420, power receptacle 412, or both. The GUID may be stored in memory 408, 458 (e.g., one-time programmable memory, reprogrammable memory, RAM, ROM, or the like), circuitry, on a removable device, on a non-removable device, or in some other way. In some cases, the GUID is a numerical value or an alphanumeric value of any suitable length and configuration, in some cases GUID is formed with a circuit comprising a plurality of switches, in some cases the GUID is obfuscated (e.g., encrypted, encoded, hashed, or obfuscated in another way), in some cases, the GUID is stored in clear text. The GUID may be system-wide unique, world-wide unique, unique amongst all devices of a particular entity (e.g., customer, client, business, location, geographic area, or the like). In at least some cases, the GUID or a representation of the GUID is integrated with the activation interface 450 (e.g., a unique QR code, a unique bar code, a unique NFC identifier, or the like).

Each of the power receptacle devices 420 may further include an input power interface 402 arranged to receive input power into the power receptacle device 420, a controllable switch 424 coupled between the input power interface 402 and the power receptacle 412, an activation interface 450, a processor 406, 456, and a memory 408, 458. In addition to storing software instructions executable by the processor, the memory 408, 458 in some cases stores the GUID, calibration data, power metering data collected during use of the device, a customer identifier arranged to logically couple any one or more power receptacle devices 420 to a specific customer entity.

In the embodiment of FIG. 11, the system also includes one or more remote computing servers 604a-604e. A remote computing server is a computing device along the lines of other computing devices described in the present disclosure. That is, such computing servers include a processor, memory that stores instructions executable by the processor, and other computing circuitry including communications circuitry. In many cases, the remote computing servers 604a-604e are remotely located from the power receptacle devices 420 (e.g., hundreds of yards, dozens, hundreds, or even thousands of miles, or some other distance). Often the hardware of the remote computing servers are arranged as a set of networked computing resources as will be known to those of skill in the art and further arranged with computing server software resources as will be known to those of skill in the art. When programmed in accordance with the teaching of the present disclosure, however, these remote computing servers are transformed into specific computing devices arranged to carry out the principles and acts described herein and thereby reduce energy consumption, heat production, and other inefficiencies that contribute to climate change and other negative or otherwise undesirable outcomes.

Although five separate remote computing servers 604a-604e are described in the present disclosure, those of skill in the art will recognize that the operations described herein may be performed by a single server, two servers, or any number of servers. Hence, a description of any particular act or acts attributed to one particular server is presented for brevity and clarity. In operation, the particular act or acts may be desirably carried out with the described remote computing server or any other computing server.

The first computing server 604a in the embodiment of FIG. 11 is an operational server and a web-hosting server. Based on the GUID described herein, one or more unique web pages may be created, stored, and served to an internet-accessible device such as mobile computing device 602 that is attempting to enable the access of electrical power from the particular power receptacle device 420 or power receptacle 412 associated with the GUID. The first computing server 604a had, among other logic, an engagement module 608 and an activation module 610.

The second computing server 604b in the embodiment of FIG. 11 may be referred to as an ad server, a directed content server, or some other like term. The second computing server 604b is arranged, when so requested, to direct particularly selected web pages be sent to a particularly selected target computing device.

A third computing server 604c is arranged to control operations of one or more repositories. In the present embodiment, a first repository is a relational database 606a, and a second repository is a revenue database 606b. These repositories are arranged to organize, store, provide, and otherwise maintain and deliver information related to the operations of the decentralized power architecture system and method 600c.

A fourth computing server 604d is a messaging server. The messaging server is arranged to take direction from the first operational computing server 604a, the second web-hosting computing server 604b, the repository computing server 604c, or some other source. In particular, the messaging computing server 604d is arranged to direct operations of a gateway bridge 618.

A fifth computing server 604e is a third-party web hosting computing server. The third-party webhost computing server 604e may be any web hosting server accessible on the internet or other local or wide area network.

The gateway bridge 618 in the present embodiment is a communications device. Particularly, the gateway bridge is arranged to receive communications from one or more remote computing servers via wide area network communications (e.g., the internet, a cellular network, a wired network, or any other such network) and provide communications to one or more power receptacle devices 420. The communications circuitry of any device in the embodiment may be in accordance with any desirable standardized, proprietary, or other protocol. The gateway bridge 618 may operate in some cases in accordance with an IEEE 802.11 wireless protocol, a long-range (LORA)-based communications protocol, or any other suitable protocol.

In many cases, the gateway bridge 618 is located proximate the plurality of power receptacle devices 420 (e.g., within 10 feet, 100 feet, 1000 feet, or some other proximity). In some cases, the proximity of the gateway bridge 618 to any one or more power receptacle devices 420 is a function of the robustness of the selected communications protocol enabled the devices that will communicate as will be known by those of skill in the art.

Now considering an exemplary but non-limiting operational embodiment of the system taught in FIG. 11, a user 620 has access to a particular mobile computing device 602. In this case, the mobile computing device may be a smartphone, tablet, or other such device. For brevity, the mobile computing device 602 of this embodiment may be referred to as smartphone 602.

The user 620 in this case is in an area where one or more power receptacle devices 420 are available for physical access (e.g., airport, convention center, café, or any other such locale as described herein). The user 620 is desirous of receiving electrical power to charge his smartphone 602.

In a first data transfer operation 701 at a first time, the user brings the smartphone 602 in proximity to the power receptacle device 420 and uses smartphone 602 to engage the activation interface 450. In this case, the engagement includes using a camera or other image sensor of the smartphone 602 to capture at least one datum representative of the GUID associated with the power receptacle device 420 (e.g., an image of the QR code activation interface 450 displayed on the power receptacle device 420).

In a second data transfer 702, the smartphone 602 is communicatively coupled to the first computing server 604*a* based on the activation interface 450. The activation interface (e.g., the QR code in this case) uniquely identifies the particular power receptacle device. Accordingly, based on the unique URL embodied in the QR code activation interface 450, the first computing server 604*a* will identify the particular power receptacle device 420 that the user 620 wishes to engage. Stated differently, via the unique QR code, the smartphone 602 is arranged to communicate the GUID to the first computing server 604*a*.

In response to the communicative connection instantiated by the second data transfer 702, a third data transfer 703 communicates a unique web page 612*n* to the smartphone 602. The unique web page 612*n* is based on the unique GUID of the particular power receptacle device 420 or particular power receptacle 412. Stated differently, in at least some cases, each unique power receptable device 420 (or each unique power receptacle 412) having an associated identifier (i.e., GUID) has an associated web page 612*a*, 612*b*, 612*n* that can be appropriately served from a web hosting function of the first remote computing server 604*a*. In at least some cases, the web page 612*n* is along the lines as that presented in FIGS. 8A, 9A. The web page 612*n* is consumed via the content consumption logic 486*a* of the smartphone 602.

A fourth data transfer 704 is directed by the engagement module 608 of the first computing server 604*a*. Here, the first computing server 604*a* communicates with the second computing server to arrange delivery of particular multimedia content to the smartphone 602 of the user 620.

In response to the fourth data transfer 704, the second computing server 604*b* captures the activation event via a fifth data transfer 705 to the third computing server 604*c*. In at least some cases, the fifth data transfer 705 represents a first revenue event. This event, and appropriate corresponding metadata, is captured in the revenue database 606*b*.

Concurrent the fifth data transfer 705, the first computing server 604*a* institutes a sixth data transfer 706 to the third computing server 604*c*. In at least some cases, the sixth data transfer 706 represents a first activation event. This event, and appropriate corresponding meta data, is captured in the relational database 606*a* of the third computing server 604*c*.

A seventh data transfer 707 involves communication from the second computing server 604*b* to the first computing server 604*a*. This seventh data transfer 707 sends or otherwise identifies the particular content (e.g., an advertisement, a survey, or some other content) that will be passed to the smartphone 602. In some cases, the seventh data transfer 707 includes the content. In other cases, the seventh data transfer 707 merely identifies the content, and in these cases, the first computing server 604*a* may have the content stored.

In an eighth data transfer 708, the first computing server 604*a* serves the content to the smartphone 602, or, alternatively, the first computing server 604*a* may communicate a particular URL to the smartphone 602, and the smartphone 602 may gain access to the content via a third party fifth computing server 604*e*.

Based on service of the content or the known URL, the first computing server 604*a* can know whether or not the user 620, via smartphone 602, consumes the content (e.g., whether the user 620 has watched the advertisement, listened to the pitch, participated in the survey, or the like). After the content is consumed via the content consumption logic 686*a* of the smartphone 602, the first computing server 604*a* will cause the ninth data transfer 709. In at least some cases, the ninth data transfer 709 is along the lines of the decentralized power architecture use case presented in FIG. 7C. Here, the targeted content has been consumed, and the user 620 is presented with an opportunity to receive access to the electrical power (e.g., presentation of an "Activate Power" event on the display screen of the smartphone 602).

A tenth data transfer 710 is communicated between the smartphone 602 and the first computing server 604*a*. The tenth data transfer 710 represents proof (e.g., an evidence-of-completion signal as an indication that the multimedia content has been delivered) that the user 620 consumed the content and a request for activation of the power. Accordingly, the tenth data transfer 710 events are processed via the activation module 610 of the first computing server 604*a*.

The activation module 610 causes communication of the eleventh data transfer 711 between the first computing server 604*a* and the second computing server 604*b*. The eleventh data transfer 711 represents a proof to the second computing server 604*b*, an advertisement server for example, that the content has been consumed (e.g., evidence-of-completion signal).

In response to the eleventh data transfer 711, the second computing server 604*b* captures the activation event via a twelfth data transfer 712 to the third computing server 604*c*. In at least some cases, the twelfth data transfer 712 represents a second revenue event. This event, and appropriate corresponding metadata, is captured in the revenue database 606*b*.

Concurrent the eleventh data transfer 711, the first computing server 604*a* institutes a thirteenth data transfer 713 to the third computing server 604c. In at least some cases, this thirteenth data transfer 713 represents a second activation event. This second activation event, and appropriate corresponding meta data, is captured in the relational database 606a of the third computing server 604c.

A fourteenth data transfer 714 between the third computing server 604c and the fourth messaging computing server 604d, or optionally, an additional or alternative data transfer 714a between the first computing server 604a and the fourth messaging computing server 604d, directs the fourth messaging computing server 604d to begin activating power.

Optionally, yet one more revenue event data transfer 715 is realized in a communication between the second advertisement computing server 604b and the third repository computing server 604c, which represents a third revenue event. This third revenue event, and appropriate corresponding metadata, is captured in the revenue database 606b.

In at least some cases, the fifteenth data transfer 715 is further associated with directing the web browser of the smartphone 602 to a URL of a third party fifth computing server 604e as a sixteenth data transfer 716. In at least some cases, the corresponding events also cause one or more datums (e.g., "cookies") to be placed in the memory of the smartphone 602. Said datums may be later used to cause additional revenue events based on the user's 620 operation of the browser, smartphone 602, and other factors.

Having received one or both of the fourteenth data transfer 714, 714a communications, the fourth messaging computing server 604d directs a seventeenth data transfer 717 between the fourth computing server 604d and the gateway bridge 618. The seventeenth data transfer 717 is an activation message that represents an interim act to enabling electrical power to be accessible at the appropriate power receptacle 412. Accordingly, the seventeenth data transfer 717 includes sufficient information for the gateway bridge 618 to identify the appropriate power receptacle 412.

The eighteenth data transfer 718 is caused by receipt of the seventeenth data transfer 717 at the gateway bridge 618. The eighteenth data transfer 718 represents a power activation signal. When the power receptacle device 420 receives this power activation signal, the processor of the power receptacle device 420 temporarily directs the controllable switch 424 to pass power to the power receptacle 412. As described herein, this power activation signal is only received at the power receptacle device 420 after a user 620 performs at least one confirming act associated with the GUID of the power receptacle device 420.

As shown in the data flow embodiment of FIG. 11, the data transfer operations may be asynchronous, but related. That is, initial action by the user 620 leads to first data transfers, and subsequent bidirectional or multi-directional user engagement leads to an ongoing sequence of data transfers that enable access to electrical power at the specific power receptacle 412 desired by the user 620. At any point, if the user 620 disengages, the disengagement may be detected by the detection circuitry 460, 460a or logic of the processor, and the process can be restarted. Optionally, the process may be re-started from the very first data transfer 701. Alternatively, the process may be re-started from a point where disengagement was detected or some other point.

In some cases, the amount of time a user 620 has access to power may be based on the volume of content consumed by the user 620. For example, consuming more content (e.g., two advertisement videos, three advertisement videos, or the like) entitles the user 620 to receive additional power (e.g., two portions, three portions, or the like). In some cases, the volume of time, or the volume of electricity, the user 620 is entitled to receive is based on data stored in the power receptacle device 420 or based on an algorithm executed in the power receptacle device 420. Alternatively, or additionally, the volume of time or charge may be determined by one of the remote computing servers 604a-604d and communicated to the power receptacle device 420 in the eighteenth data transfer 718.

In some cases, the operational embodiment of FIG. 11 may be modified in any desirable way without departing from the teaching of the present disclosure. For example, in one case of a computer-implemented method to deliver power through a power receptacle 412 to an electrically powered device that is electromechanically coupled to the power receptacle 412, a first act of the power activation protocol includes accepting, at the smartphone 602, a representation of credit (e.g., a voucher, a coupon, an access code, or the like) for access to power entered by the user. In this case, at least one of the plurality of acts of the power activation protocol includes communicating, via the smartphone 602, the evidence-of-completion signal, wherein the evidence-of-completion signal is an indication that the representation of credit has been entered.

Having now set forth certain embodiments, further clarification of certain terms used herein may be helpful to providing a more complete understanding of that which is considered inventive in the present disclosure.

Various figures include data flow diagrams illustrating non-limiting processes that may be used by embodiments of a system level deployment of a decentralized power architecture (DPA) 400 as described herein. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as one or more components of DPA 400. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein (e.g., processor 406, processor 456), include central processing units (CPU's), microcontrollers (MCU), digital signal processors (DSP), application specific integrated circuits (ASIC), peripheral interface controllers (PIC), systems-on-chip (SOC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments that include or otherwise cooperate with one or more computing devices. It is recognized that these computing devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

Amongst other things, one or more of the exemplary computing devices of the present disclosure (e.g., the authorization circuit 410 of FIG. 1 and at least some portions or modules of the access circuit 410 of FIG. 1, such as processors 406, 456 and memories 408, 458) may be configured in any type of mobile or stationary computing device such as a remote cloud computer, a computing server, a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device (e.g., factory robotic device, home-use robotic device, retail robotic device, office-environment robotic device), a power cube, or the like. Accordingly, the computing devices include other components and circuitry that is not illustrated, such as, for example, a display, a network interface, memory, one or more central processors, camera interfaces, audio interfaces, and other input/output interfaces. In some cases, the exemplary computing devices may also be configured in a different type of low-power device such as a mounted video camera, an Internet-of-Things (IoT) device, a multimedia device, a motion detection device, an intruder detection device, a security device, a crowd monitoring device, or some other device.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of network-style computing, but there are other techniques and tools that remain available to implement run-time dynamic computing. Therefore, the claimed subject matter does not foreclose the whole or even substantial network-style computing technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific locally performed, server-side system features claimed herein. The embodiments described in the present disclosure improve upon known network-style processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform network-style operations.

Software may include a fully executable software program, a simple configuration data file, a link to additional directions, or any combination of known software types. When a computing device updates software, the update may be small or large. For example, in some cases, a computing device downloads a small configuration data file as part of a software update, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the computing systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as DPA 400 or some other module or circuit may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor 406, 456 of the DPA 400 (FIG. 1). The computing instructions may be stored individually or as groups of instructions in files. The files may include functions, services, libraries, and the like. The files may include one or more computer programs or may be part of a larger computer program. Alternatively, or in addition, each file may include data or other computational support material useful to carry out the computing functions of an improved network computing system.

Buttons, keypads, computer mice, memory cards, serial ports, bio-sensor readers, touch screens, and the like may individually or in cooperation be useful to a software practitioner programming the improved network computing system. The devices may, for example, input control information into the system. Displays, printers, memory cards, LED indicators, temperature sensors, audio devices (e.g., speakers, piezo device, etc.), vibrators, and the like are all useful to present output information to the software practitioner operating the improved network computing system. In some cases, the input and output devices are directly coupled to a local computing device. and electronically coupled to a processor or other operative circuitry. In other cases, the input and output devices pass information via one or more communication ports (e.g., RS-232, RS-485, infrared, USB, etc.).

As described herein, for simplicity, a user may in some cases be described in the context of the male gender. It is understood that a software practitioner can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

The terms, "real-time" or "real time," as used herein and in the claims that follow, are not intended to imply instantaneous processing, transmission, reception, or otherwise as the case may be. Instead, the terms, "real-time" and "real time" imply that the activity occurs in a digital fashion over an acceptably short period of time (e.g., over a period of microseconds or milliseconds), and that the activity may be performed on a constant or otherwise digitally ongoing basis (e.g., maintaining a persistent actual or virtual connection with a remote computing server). An example of an activity that is not real-time is one that occurs over an extended period of time (e.g., hours or days) or that occurs based on intervention or direction by a software practitioner or other activity.

In the absence of any specific clarification related to its express use in a particular context, where the terms "substantial" or "about" or any of their cognates are used as modifiers in the present disclosure and any appended claims (e.g., to modify a structure, a dimension, a measurement, or some other characteristic), it is understood that the characteristic may vary by up to 30 percent. For example, a time between messages may be described as being about a half-second. In these cases, a message interval that is exactly one-half second is exactly 500 milliseconds. Different from the exact precision of the term, "half-second," the use of "substantially" or "about" to modify the characteristic permits a variance of the "half-second" characteristic by up to 30 percent. Accordingly, a messaging interval that is about a half-second includes messaging intervals between 350 milliseconds and 650 milliseconds.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise," as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not to be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms of "a," "an," and "the" in the present disclosure include plural referents unless the content and context clearly dictates otherwise. The conjunctive terms, "and" and "or," are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses, or sentences such that the thing following the comma is also included in the list.

The headings and Abstract of the Disclosure provided herein are for convenience only and do not interpret the scope or meaning of the embodiments.

The decentralized power architecture systems described in the present disclosure provide several technical effects and advances to the field of electrical power.

Technical effects and benefits include the ability to improve the delivery of power, particularly in an area of public accommodation. For example, in at least one embodiment, power receptacles in a public area such as an airport terminal or a coffee shop have an authorization circuit. When a user approaches the power receptacle, the power receptacle will not deliver power until the user goes through an activation process. In some embodiments, the activation process includes using a smartphone or other mobile computing device to interact with an activation interface. The activation interface may include using a camera to scan a bar code or quick response (QR) code, bringing a near field controller or smart card embedded in the mobile computing device in proximity to the power receptacle, or taking some other action. Based on the interaction of the user, a system-wide globally unique identifier (GUID) is communicated from the mobile computing device to a remote computing server, and in response, certain multimedia (e.g., mobile computing device advertising videos, audio, or the like) is communicated back the mobile computing device. Upon consuming the multimedia content, an activation signal is communicated to the power receptacle associated with the GUID, and power is temporarily (e.g., 5 to 255 minutes or some other time duration) delivered to the subject power receptacle. In some cases, the power delivered through the power receptacle is directly measured and reportable. In this way, power grid operators can also harden their power grid, save passive power otherwise consumed by devices that are "plugged in," but not otherwise operating.

The present disclosure sets forth details of various structural embodiments that may be arranged to carry the teaching of the present disclosure. By taking advantage of the flexible circuitry, mechanical structures, computing architecture, and communications means described herein, a number of exemplary devices and systems are now disclosed.

Example A-1 is a power receptacle device, comprising: a housing; a power receptacle contained in the housing; a globally unique identifier (GUID) associated with the power receptacle; an input power interface arranged to receive input power into the power receptacle device; a controllable switch coupled between the input power interface and the power receptacle; an activation interface; and a processor, wherein the processor is arranged to receive a power activation signal and, based on the power activation signal, temporarily direct the controllable switch to pass power to the power receptacle, wherein the power activation signal is received after a user performs at least one confirming act associated with the GUID. Sometimes, the power activation signal is received only after the user performs the at least one confirming act associated with the GUID.

Example A-2 may include the subject matter of Example A-1, and alternatively or additionally any other example herein, wherein the power activation signal is receivable from a local bridge device.

Example A-3 may include the subject matter of Example A-2, and alternatively or additionally any other example herein, wherein the local bridge device is arranged to receive communications from the remote computing server and transmit communications toward the power receptacle.

Example A-4 may include the subject matter of any of Examples A-1 to A-3, and alternatively or additionally any other example herein, wherein the input power is mains power.

Example A-5 may include the subject matter of any of Examples A-1 to A-4, and alternatively or additionally any other example herein, wherein the input power is direct current (DC) power at a voltage of between 5 VDC and 50 VDC.

Example A-6 may include the subject matter of any of Examples A-1 to A-5, and alternatively or additionally any other example herein, wherein the power receptacle is arranged to receive conductive portions of a standardized power cord, the standardized power cord conforming to a household wiring protocol.

Example A-7 may include the subject matter of any of Examples A-1 to A-6, and alternatively or additionally any other example herein, wherein the power receptacle is arranged to receive conductive portions of a power cord that conforms to a universal serial bus (USB) protocol.

Example A-8 may include the subject matter of any of Examples A-1 to A-7, and alternatively or additionally any other example herein, wherein the controllable switch includes at least one electromechanical relay.

Example A-9 may include the subject matter of any of Examples A-1 to A-8, and alternatively or additionally any other example herein, wherein the power receptacle includes at least two individually controllable power outlets.

Example A-10 may include the subject matter of any of Examples A-1 to A-9, and alternatively or additionally any other example herein, wherein the power receptacle device further comprises a clock circuit arranged to provide a time-base for measuring how long the temporarily directed controllable switch will pass power to the power receptacle.

Example A-11 may include the subject matter of any of Examples A-1 to A-10, and alternatively or additionally any other example herein, wherein the power receptacle device further comprises a clock circuit arranged to direct the controllable switch to pass power to the power receptacle for between about 5 minutes and about 256 minutes.

Example A-12 may include the subject matter of any of Examples A-1 to A-11, and alternatively or additionally any other example herein, wherein the power receptacle device further comprises a memory circuit arranged to store a customer identifier, the customer identifier arranged to logically couple the power receptacle device to a specific customer entity.

Example A-13 may include the subject matter of any of Examples A-1 to A-12, and alternatively or additionally any other example herein, wherein the power receptacle device further comprises power meter circuitry arranged to measure an amount of power passed at any given time through the power receptacle.

Example A-14 may include the subject matter of any of Examples A-1 to A-13, and alternatively or additionally any other example herein, wherein the housing includes a frame for mounting the device in a standardized electrical junction box.

Example A-15 may include the subject matter of any of Examples A-1 to A-14, and alternatively or additionally any other example herein, wherein the housing has an open structure arranged to expose at least some of internal circuitry of the device.

Example A-16 may include the subject matter of any of Examples A-1 to A-15, and alternatively or additionally any other example herein, wherein the housing has a closed structure arranged to contain all circuitry of the device and shield the circuitry from access.

Example A-17 may include the subject matter of any of Examples A-1 to A-16, and alternatively or additionally any other example herein, wherein the housing is permanently sealed.

Example A-18 may include the subject matter of any of Examples A-1 to A-17, and alternatively or additionally any other example herein, wherein the housing includes a frame for mounting the device in a standardized single-gang electrical junction box.

Example A-19 may include the subject matter of any of Examples A-1 to A-18, and alternatively or additionally any other example herein, wherein the housing includes a frame for mounting the device in a standardized N-gang electrical junction box wherein N is 2, 3, 4, 5, 6, or some other integer less than 100.

Example A-20 may include the subject matter of any of Examples A-1 to A-19, and alternatively or additionally any other example herein, wherein the housing includes a frame for mounting the device in a table, a chair, a floor, a counter, or another structure.

Example A-21 may include the subject matter of any of Examples A-1 to A-20, and alternatively or additionally any other example herein, wherein the power receptacle is arranged to receive N power cords wherein N is 2, 3, 4, 5, 6, or some other integer less than 100.

Example A-22 may include the subject matter of any of Examples A-1 to A-21, and alternatively or additionally any other example herein, wherein the power receptacle is arranged with at least two separately controllable power outlets.

Example A-23 may include the subject matter of any of Examples A-1 to A-22, and alternatively or additionally any other example herein, wherein the power receptacle is standardized power receptacle arranged to deliver alternating current (AC) power to an electrically powered device, the AC power having a voltage of between about 100 volts and about 240 volts and a frequency of between about 50 Hz and about 60 Hz.

Example A-24 may include the subject matter of any of Examples A-1 to A-23, and alternatively or additionally any other example herein, wherein the power receptacle is arranged to receive a plug referred to as having Plug Type A, B, C, D, E, F, G, H, I, J, K, L, M, N, NEMA 14-30, NEMA 14-50, IEC 60309, CEE 7/17, CEE 7/6, CEE 7/7, TIS 166-2549, or some other Plug Type.

Example A-25 may include the subject matter of any of Examples A-1 to A-24, and alternatively or additionally any other example herein, wherein the power receptacle is arranged to receive a plug that follows a National Plug Standard referred to as IRAM 2073, AS/NZS 3112, ÖVE-IG/EN 50075, ÖVE/ÖNORM E 8620, NBN C 61 112-1, NBR 14136, CSA C22.2 No. 42, GB 1002-2008, GB 2099.1-2008, ČSN 35 4516, DS/EN 50075, DS 60884-2-D1, SFS-EN 50075, SFS 5610, NF EN 50075, NF C 61-314, DIN VDE 0620, DIN 49441, DIN EN 60309, BS 1363, BS 546, MSZ EN 50075, MSZ 97812, IS 1293, SNI 04-3892, I.S. 401, CEI 23-34, CEI 23-50, JIS C 8303, MS 1578:2003, MS 589:P.1:1997, MS 1577:2003, NMX-J-163-ANCE, EN 50075, NEN 1020, NEK EN 50075, NEK 502, VN-88/3064, NP 1260, SASO 2203, JUS N.E3.552, JUS N.E3.553, SS 145, SS 472, STN 34 4516, SANS164, KS C 8305, UNE 20315, SLS 512, SS-EN 50075, SS 428 08 34, SS-EN 60309, SN SEV 1011:2009, CNS 10917, NEME 1-15, NEMA 5-15, NEMA 14-30, NEMA 14-50, NEMA 1-15 P, NEME 5-15 P, TCVN 6188-1 or some other National Plug Standard.

Example A-26 may include the subject matter of any of Examples A-1 to A-25, and alternatively or additionally any other example herein, wherein the power receptacle is arranged to conform to a standardized form factor such as universal serial bus (USB) Type A, USB Type B, Mini-USB, Micro-USB, USB-C, Lightning, or some other standardized form factor.

Example A-27 may include the subject matter of any of Examples A-1 to A-26, and alternatively or additionally any other example herein, wherein the input power interface is arranged to receive mains power.

Example A-28 may include the subject matter of any of Examples A-1 to A-27, and alternatively or additionally any other example herein, wherein the input power interface is arranged to receive power from a direct current (DC) power supply.

Example A-29 may include the subject matter of any of Examples A-1 to A-28, and alternatively or additionally any other example herein, wherein the globally unique identifier (GUID) is a numeric identifier, an alphabetic identifier, an alpha-numeric identifier, or some other identifier;

Example A-30 may include the subject matter of any of Examples A-1 to A-29, and alternatively or additionally any other example herein, wherein the globally unique identifier (GUID) is between 8 bits and 1024 bits.

Example A-31 may include the subject matter of any of Examples A-1 to A-30, and alternatively or additionally any other example herein, wherein input power is mains power.

Example A-32 may include the subject matter of any of Examples A-1 to A-31, and alternatively or additionally any other example herein, wherein input power is, nominally, 60 VAC, 120 VAC, 208 VAC, 220 VAC, 230 VAC, 240 VAC, 260 VAC, 277 VAC, 360 VAC, 400 VAC, 415 VAC, 480 VAC, 600 VAC, or some other power source voltage, and wherein input power has, nominally, a frequency of between about 50 Hz and 60 Hz.

Example A-33 may include the subject matter of any of Examples A-1 to A-32, and alternatively or additionally any other example herein, wherein input power is, nominally, 6 VDC, 12 VDC, 24 VDC, 48 VDC, or some other power source voltage.

Example A-34 may include the subject matter of any of Examples A-1 to A-33, and alternatively or additionally any other example herein, wherein the controllable switch includes at least one relay such as an electromechanical relay, a magnetic- or electromagnetic relay, a solid state relay, or some other type of relay.

Example A-35 may include the subject matter of any of Examples A-1 to A-34, and alternatively or additionally any other example herein, wherein the controllable switch includes at least one field effect transistor (FET) such as a metal oxide semiconductor FET (MOSFET), a junction FET (JFET), or some other semiconductor-based controllable switch.

Example A-36 may include the subject matter of any of Examples A-1 to A-35, and alternatively or additionally any other example herein, wherein the activation interface is a wired interface or a wireless interface, the wired or wireless interface accessible via a public or private protocol such as 802.11 (WiFi), BLUETOOTH, infrared data association (IrDA), near field communication (NFC), or some other protocol.

Example A-37 may include the subject matter of any of Examples A-1 to A-36, and alternatively or additionally any other example herein, wherein the activation interface is a bar code, quick response (QR) code, or another code.

Example A-38 may include the subject matter of any of Examples A-1 to A-37, and alternatively or additionally any other example herein, wherein the activation interface is a visible encoded icon applied on or near the device;

Example A-39 may include the subject matter of any of Examples A-1 to A-38, and alternatively or additionally any other example herein, wherein the device further includes a clock circuit arranged to provide a time-base for measuring how long the temporarily directed controllable switch will pass power to the power receptacle.

Example A-40 may include the subject matter of any of Examples A-1 to A-39, and alternatively or additionally any other example herein, wherein the device further includes a clock circuit arranged to direct the controllable switch to pass power to the power receptacle for between about 5 minutes and about 256 minutes.

Example A-41 may include the subject matter of any of Examples A-1 to A-40, and alternatively or additionally any other example herein, wherein the device further includes logic to reprogram the GUID, said reprogramming logic may include memory rewritable after performing an unlock sequence.

Example A-42 may include the subject matter of any of Examples A-1 to A-41, and alternatively or additionally any other example herein, wherein the device further includes one-time programmable memory to store the GUID.

Example A-43 may include the subject matter of any of Examples A-1 to A-42, and alternatively or additionally any other example herein, wherein the device further includes at least one linking mechanism arranged to associate the device with a specific customer, and wherein such linking mechanism may include a button, a switch (e.g., a mechanical switch, an electronic switch, a magnetic switch, or the like), a tilt sensor, a code, an alphanumeric sequence, or some other linking mechanism.

Example A-44 may include the subject matter of any of Examples A-1 to A-43, and alternatively or additionally any other example herein, wherein the device further includes a memory circuit arranged to store a customer identifier, the customer identifier arranged to logically couple the device to a specific customer entity, wherein the customer entity is an individual, collective, or representative of an airport, train station, bus station, theme park, hotel, motel, convention center, food establishment, drink establishment, store, service center, office building, vehicle of any type or other mode of transportation, place of public accommodation as that term is defined under civil rights law of any suitable jurisdiction.

Example A-45 may include the subject matter of any of Examples A-1 to A-44, and alternatively or additionally any other example herein, wherein a customer identifier can be programmatically changed based, for example changed over time, set for a fixed period of time, cycled between two or more specific customer entities based on time or some other criteria.

Example A-64 may include the subject matter of any of Examples A-1 to A-45, and alternatively or additionally any other example herein, wherein a customer identifier can be algorithmically changed.

Example A-47 may include the subject matter of any of Examples A-1 to A-46, and alternatively or additionally any other example herein, wherein the device further includes power metering circuitry Example A-48 may include the subject matter of any of Examples A-1 to A-47, and alternatively or additionally any other example herein, wherein the device further includes power meter circuitry arranged to measure an amount of power passed at any given time through the power receptacle per charge cycle, for example, per charge, per outlet, per period of time (e.g., second, minute, hour, day, week, month, or any other period of time).

Example B-1 is a computer-implemented method to deliver power through a power receptacle to an electrically powered device that is electromechanically coupled to the power receptacle, comprising: receiving a power activation signal at a processor electrically coupled to the power receptacle, the power activation signal arranged to cause a controllable switch to deliver power to the electrically powered device through the power receptacle wherein the power activation signal is received after a user interacts with the power receptacle via an interaction interface, and wherein the user interaction includes: bringing a mobile computing device in proximity to the power receptacle; capturing, with the mobile computing device, at least one datum representative of a globally unique identifier (GUID) associated with the power receptacle; communicating, via the mobile computing device, the GUID to a remote computing device; based on a response initiated by the remote computing device, performing a plurality of acts of a power activation protocol with the mobile computing device; after completion of at least one of the plurality of acts, communicating, via the mobile computing device, an evidence-of-completion signal to the remote computing device; and delivering the power to the electrically powered device through the power receptacle. Sometimes, the power activation signal is received only after the user performs the at least one confirming act associated with the GUID.

Example B-2 may include the subject matter of Example B-1, and alternatively or additionally any other example herein, wherein a first act of the plurality of acts of the power activation protocol includes delivering multimedia content through the mobile computing device for consumption by the user, wherein a second act of the plurality of acts of the power activation protocol includes communicating via the mobile computing device the evidence-of-completion signal, and wherein the evidence-of-completion signal is an indication that the multimedia content has been delivered.

Example B-3 may include the subject matter of Example B-2, and alternatively or additionally any other example herein, wherein the multimedia content is a video advertisement.

Example B-4 may include the subject matter of any of Examples B-1 to B-3, and alternatively or additionally any other example herein, wherein a first act of the power activation protocol includes accepting, at the mobile computing device, a representation of credit for access to power, wherein a second act of the plurality of acts of the power activation protocol includes communicating, via the mobile computing device, the evidence-of-completion signal, and wherein the evidence-of-completion signal is an indication that the representation of credit has been entered.

Example B-5 may include the subject matter of any of Examples B-1 to B-4, and alternatively or additionally any other example herein, wherein the representation of credit is a voucher code.

Example B-6 may include the subject matter of any of Examples B-1 to B-5, and alternatively or additionally any other example herein, wherein the power activation signal is triggered by a message communicated from a local bridge device towards the power receptacle.

Example B-7 may include the subject matter of any of Examples B-1 to B-6, and alternatively or additionally any other example herein, wherein the power is delivered to the electrically powered device through the power receptacle.

Example C-1 is a system to temporarily deliver power through a power receptacle, comprising: a plurality of power receptacle devices in a first geographic area, each power receptacle device having: a housing; a power receptacle contained in the housing; a globally unique identifier (GUID) associated with the power receptacle; an input power interface arranged to receive input power into the power receptacle device; a controllable switch coupled between the input power interface and the power receptacle; an activation interface; and a processor, wherein the processor is arranged to: receive a second power activation signal; and based on the second power activation signal, temporarily direct the controllable switch to pass power to the power receptacle, wherein the second power activation signal is received after a user performs at least one confirming act associated with the GUID of the power receptacle device; at least one remote computing server, the at least one remote computing server having: an engagement module arranged to receive a respective GUID from a mobile computing device proximate a respective power receptacle device associated with the user; a web host module arranged to serve one or more web pages to the mobile computing device based on the respective GUID; and an activation module arranged to cause a first power activation signal to be communicated toward a bridge device; and the bridge device, wherein the bridge device is arranged to: receive the first power activation signal from the activation module of the at least one computing server; and based on receipt of the first power activation signal, communicate the second power activation signal towards a specific power receptacle device of the plurality of power receptacle devices, the specific power receptacle being associated with a respective GUID received by the engagement module. Sometimes, the first or second power activation signal is received only after the user performs the at least one confirming act associated with the GUID.

Example C-2 may include the subject matter of Example C-1, and alternatively or additionally any other example herein, wherein the power receptacle is arranged to receive conductive portions of a standardized power cord, the standardized power cord conforming to a household wiring protocol.

Example C-3 may include the subject matter of Example C-2, and alternatively or additionally any other example herein, wherein the power receptacle is arranged to receive conductive portions of a power cord that conforms to a universal serial bus (USB) protocol.

Example C-4 may include the subject matter of any of Examples C-1 to C-3, and alternatively or additionally any other example herein, wherein the activation interface is a bar code or a quick response (QR) code.

Example C-5 may include the subject matter of any of Examples C-1 to C-4, and alternatively or additionally any other example herein, wherein at least one web page served by the web host module is a multimedia advertisement.

Example D-1 is a system, comprising: an authorization circuit having at least one authorization mechanism; and an access circuit having at least one key mechanism, the access circuit being electrically couplable to the authorization circuit, wherein the authorization circuit, upon successfully authorizing at least one datum communicated from the key mechanism of the access circuit, is arranged to deliver power having determined characteristics to the access circuit. In some cases, the system further comprises a plurality of municipality-based mining devices physically located on, within, or proximate to infrastructure of a certain municipality, each of the plurality of municipality-based mining devices arranged to receive utility grid power on behalf of the certain municipality and further arranged for high-speed communications to the centralized computing platform, wherein each of the plurality of municipality-based mining devices includes cooperation logic arranged to prevent duplication of work of others of the plurality of municipality-based mining devices.

Example D-2 may include the subject matter of Example D-1, and alternatively or additionally any other example herein, wherein the authorization circuit is arranged as a circuit wired to a power infrastructure in a building.

Example D-3 may include the subject matter of Example D-2, and alternatively or additionally any other example herein, wherein the authorization circuit is arranged as a circuit wirelessly coupled to a power infrastructure in a building.

Example D-4 may include the subject matter of any of Examples D-1 to D-3, and alternatively or additionally any other example herein, wherein the access circuit is arranged as a smart power plug arranged to deliver power to a mobile computing device.

Example E-1 is a system, comprising: an authorization circuit having at least one authorization mechanism; and an access circuit having at least one content consumption mechanism, the access circuit being electrically couplable to the authorization circuit, wherein the authorization circuit, upon successfully authorizing at least one datum, is arranged to deliver power having determined characteristics to the access circuit, wherein successful authorization includes the content consumption mechanism receiving content and presenting said content on a human-interface of the system.

Example E-2 may include the subject matter of Example E-1, and alternatively or additionally any other example herein, wherein the authorization circuit is arranged as a circuit wired to a power infrastructure in a building.

Example E-3 may include the subject matter of Example E-2, and alternatively or additionally any other example herein, wherein the authorization circuit is arranged as a circuit wirelessly coupled to a power infrastructure in a building.

Example E-4 may include the subject matter of any of Examples E-1 to D-3, and alternatively or additionally any other example herein, wherein the access circuit is arranged as a smart power plug arranged to deliver power to a mobile computing device.

The various embodiments described above can be combined to provide further embodiments. Various features of the embodiments are optional, and features of one embodiment may be suitably combined with other embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

U.S. Provisional Patent Application No. 63/213,102, filed Jun. 21, 2021, and entitled "Municipality-Based Distributed Ledger Architecture" is incorporated herein by reference, in its entirety.

The various embodiments described above can be combined to provide further embodiments. Aspects of the embodiments can be modified, if necessary to employ concepts of the various patents, application and publications to provide yet further embodiments.

This application claims the benefit of priority to U.S. Provisional Application No. 63/267,145, filed Jan. 26, 2022 and U.S. Provisional Application No. 63/477,175, filed Dec. 23, 2022, which applications are hereby incorporated by reference in their entirety.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

The invention claimed is:

1. A power receptacle device, comprising:
   a housing;
   a power receptacle contained in the housing;
   a globally unique identifier (GUID) associated with the power receptacle;
   an input power interface arranged to receive input power into the power receptacle device;
   communications circuitry arranged to receive a power activation signal from a local bridge device, the local bridge device separate and distinct from the power receptacle device;
   a controllable switch coupled between the input power interface and the power receptacle;
   an activation interface arranged proximate the power receptacle, the activation interface facilitating access to a remote computing server via a mobile computing device, said remote computing server arranged to direct multimedia advertising towards the mobile computing device, said multimedia advertising arranged for consumption through the mobile computing device as consideration for access to electricity through the power receptacle; and a processor, wherein the processor is arranged to:
  receive the power activation signal from the communications circuitry; and
  based on the power activation signal, temporarily direct the controllable switch to pass power to the power receptacle, wherein the power activation signal is received only after a user performs at least one confirming act associated with the GUID, the at least one confirming act including a communication from the mobile computing device to the remote computing server confirming that the multimedia advertising has been consumed.

2. The power receptacle device of claim 1 wherein the local bridge device is a LoRaWAN gateway device.

3. The power receptacle device of claim 2 wherein the local bridge device is arranged to receive communications from a remote computing server and transmit communications toward the power receptacle.

4. The power receptacle device of claim 1 wherein input power is mains power.

5. The power receptacle device of claim 1 wherein the input power is direct current (DC) power at a voltage of between 5 VDC and 50 VDC.

6. The power receptacle device of claim 1 wherein the power receptacle is arranged to receive conductive portions of a standardized power cord, the standardized power cord conforming to a household wiring protocol.

7. The power receptacle device of claim 1 wherein the power receptacle is arranged to receive conductive portions of a power cord that conforms to a universal serial bus (USB) protocol.

8. The power receptacle device of claim 1 wherein the controllable switch includes at least one electromechanical relay.

9. The power receptacle device of claim 1 wherein the power receptacle includes at least two individually controllable power outlets.

10. A computer-implemented method to deliver power through a power receptacle to an electrically powered device that is electromechanically coupled to the power receptacle, comprising:
  receiving a power activation signal from a local bridge device at a processor electrically coupled to the power receptacle, the local bridge device separate and distinct from the power receptacle device, the power activation signal arranged to cause a controllable switch to deliver power to the electrically powered device through the power receptacle wherein the power activation signal is received only after a user interacts with the power receptacle via an interaction interface, and wherein the user interaction includes:
    bringing a mobile computing device in proximity to the power receptacle;
    capturing, with the mobile computing device, at least one datum representative of a globally unique identifier (GUID) associated with the power receptacle;
    communicating, via the mobile computing device, the GUID to a remote computing device;
    based on a response initiated by the remote computing device, performing a plurality of acts of a power activation protocol with the mobile computing device;
    after completion of at least one of the plurality of acts, communicating, via the mobile computing device, an evidence-of-completion signal to the remote computing device; and
  delivering the power to the electrically powered device through the power receptacle.

11. The computer-implemented method to deliver power through the power receptacle to the electrically powered device that is electromechanically coupled to the power receptacle according to claim 10, wherein a first act of the plurality of acts of the power activation protocol includes delivering multimedia content through the mobile computing device for consumption by the user, wherein a second act of the plurality of acts of the power activation protocol includes communicating via the mobile computing device the evidence-of-completion signal, and wherein the evidence-of-completion signal is an indication that the multimedia content has been delivered and consumed.

12. The computer-implemented method to deliver power through the power receptacle to the electrically powered device that is electromechanically coupled to the power receptacle according to claim 11, wherein the multimedia content is a video advertisement.

13. The computer-implemented method to deliver power through the power receptacle to the electrically powered device that is electromechanically coupled to the power receptacle according to claim 12, wherein the power activation signal is triggered by a message communicated from the local bridge device towards the power receptacle.

14. The computer-implemented method to deliver power through the power receptacle to the electrically powered device that is electromechanically coupled to the power receptacle according to claim 11, wherein a first act of the power activation protocol includes accepting, at the mobile computing device, a representation of credit for access to power, wherein a second act of the plurality of acts of the power activation protocol includes communicating, via the mobile computing device, the evidence-of-completion signal, and wherein the evidence-of-completion signal is an indication that the representation of credit has been entered.

15. The computer-implemented method to deliver power through the power receptacle to the electrically powered device that is electromechanically coupled to the power receptacle according to claim 14, wherein the representation of credit is a voucher code.

16. A system to temporarily deliver power through a power receptacle, comprising:
  a plurality of power receptacle devices in a first geographic area, each power receptacle device having:
    a housing;
    a power receptacle contained in the housing;
    a globally unique identifier (GUID) associated with the power receptacle;
    an input power interface arranged to receive input power into the power receptacle;
    communications circuitry arranged to receive a second power activation signal from a local bridge device, the local bridge device separate and distinct from the power receptacle device;
    a controllable switch coupled between the input power interface and the power receptacle;
    an activation interface arranged proximate the power receptacle, the activation interface facilitating access to at least one remote computing server via a mobile computing device, said at least one remote computing server arranged to direct multimedia advertising towards the mobile computing device, said multimedia advertising arranged for consumption through the mobile computing device as consideration for access to electricity through the power receptacle; and a processor, wherein the processor is arranged to:
receive the second power activation signal from the communications circuitry; and
based on the second power activation signal, temporarily direct the controllable switch to pass power to the power receptacle, wherein the second power activation signal is received after a user performs at least one confirming act associated with the GUID of the power receptacle device, the at least one confirming act including a communication from the mobile computing device to the at least one remote computing server confirming that the multimedia advertising has been consumed;

the at least one remote computing server, wherein the at least one remote computing server has:
an engagement module arranged to receive a respective GUID from the mobile computing device proximate a respective power receptacle device associated with the user;
a web host module arranged to serve one or more web pages to the mobile computing device based on the respective GUID; and
an activation module arranged to cause a first power activation signal to be communicated toward the local bridge device; and the local bridge device, wherein the local bridge device is arranged to:
receive the first power activation signal from the activation module of the at least one computing server; and
based on receipt of the first power activation signal, communicate the second power activation signal towards a specific power receptacle device of the plurality of power receptacle devices, the specific power receptacle being associated with a respective GUID received by the engagement module.

17. The system to temporarily deliver power through the power receptacle of claim 16, wherein the power receptacle is arranged to receive conductive portions of a standardized power cord, the standardized power cord conforming to a household wiring protocol.

18. The system to temporarily deliver power through the power receptacle of claim 16, wherein the power receptacle is arranged to receive conductive portions of a power cord that conforms to a universal serial bus (USB) protocol.

19. The system to temporarily deliver power through the power receptacle of claim 16, wherein the activation interface is a bar code or a quick response (QR) code.

20. The system to temporarily deliver power through the power receptacle of claim 16, wherein at least one web page served by the web host module is a multimedia advertisement.

\* \* \* \* \*